US011081755B1

(12) United States Patent
Goldin et al.

(10) Patent No.: US 11,081,755 B1
(45) Date of Patent: Aug. 3, 2021

(54) HOUSING FOR A CONFORMAL WEARABLE BATTERY

(71) Applicant: Inventus Power, Inc., Woodridge, IL (US)

(72) Inventors: Elijah Brett Goldin, Chicago, IL (US); Timothy James Vallaro, Batavia, IL (US); Bryan Rossman, Warrenville, IL (US); Daniel Paul Rose, Wheaton, IL (US); Marcelo Nicosia, Oak Park, IL (US); Horace C. Rodriguez, Schaumburg, IL (US)

(73) Assignee: Inventus Power, Inc., Woodridge, IL (US)

( * ) Notice: Subject to any disclaimer, the term of this patent is extended or adjusted under 35 U.S.C. 154(b) by 0 days.

(21) Appl. No.: 17/085,873

(22) Filed: Oct. 30, 2020

Related U.S. Application Data

(63) Continuation-in-part of application No. 17/038,287, filed on Sep. 30, 2020.

(51) Int. Cl.
*H01M 2/02* (2006.01)
*H01M 50/209* (2021.01)

(52) U.S. Cl.
CPC ...... *H01M 50/209* (2021.01); *H01M 2220/30* (2013.01)

(58) Field of Classification Search
CPC .............. H01M 2/1061; H01M 2220/30
See application file for complete search history.

(56) References Cited

U.S. PATENT DOCUMENTS 3,993,507 A * 11/1976 Hardigg .............. H01M 2/0237
429/176
4,053,685 A  10/1977 Rowley et al.
(Continued)

FOREIGN PATENT DOCUMENTS

CN  201922162396  7/2020
KR  20080056978 A  6/2008
(Continued)

OTHER PUBLICATIONS

Rogers Corporation, "Poron® ShockSeal™ 4790-79 Foams," visited on Nov. 2, 2020 at <https://rogerscorp.com/Elastomeric%20Material%20Solutions/PORON%20Industrial%20Polyurethanes/PORON%20ShockSeal%204790%2079%20Foams>, 3 pp.
(Continued)

*Primary Examiner* — Cynthia K Walls
(74) *Attorney, Agent, or Firm* — Banner & Witcoff, Ltd.

(57) ABSTRACT

A molded housing may enclose an electronic component and include an electrically conductive contact component embedded within an exterior wall to conduct electricity between an interior and an exterior of the casing. The contact component may include two knurled areas separated by a recessed groove. The knurled areas and recessed groove may be coplanar with the exterior wall. The knurled areas and recessed groove may form an interface with the molded casing to seal the casing against ingress of liquid into the interior. The molded casing may include an upper housing and a lower housing formed from a combination of a rigid member and a flexible member. The rigid member may have a plurality of rigid regions, and the flexible member may have a plurality of flexible regions formed between neighboring rigid regions. The flexible member may be molded onto the rigid member using a two-shot injection molding process. In some examples, the contact component may be
(Continued)

secured to a contact carrier, where the contact carrier is then secured to the exterior housing.

18 Claims, 23 Drawing Sheets

(56) References Cited

U.S. PATENT DOCUMENTS

| | | | |
|---|---|---|---|
| 4,346,151 A | | 8/1982 | Uba et al. |
| 4,658,498 A | | 4/1987 | Yamaura et al. |
| 6,376,126 B1 | * | 4/2002 | Faust .............. H01M 10/0413 |
| | | | 429/176 |
| 6,410,184 B1 | | 6/2002 | Horiuchi et al. |
| 6,528,204 B1 | | 3/2003 | Hikmet et al. |
| 6,773,848 B1 | | 8/2004 | Nortoft et al. |
| 8,192,863 B2 | | 6/2012 | Best et al. |
| 8,795,880 B2 | | 8/2014 | Matsubara |
| 8,860,372 B2 | | 10/2014 | Guang et al. |
| 8,927,137 B2 | | 1/2015 | Ayub et al. |
| 9,564,761 B2 | | 2/2017 | Hopfer, III et al. |
| 9,640,831 B2 | | 5/2017 | Tajima et al. |
| 9,660,225 B2 | | 5/2017 | Miyake |
| 9,755,279 B2 | | 9/2017 | Moon |
| 9,756,733 B2 | | 9/2017 | Drzaic et al. |
| 9,780,421 B2 | | 10/2017 | Palanchon et al. |
| 9,843,073 B2 | | 12/2017 | Yoneda et al. |
| 9,941,506 B2 | | 4/2018 | Hiroki et al. |
| 10,056,584 B2 | | 8/2018 | Hwang |
| 10,134,528 B2 | | 11/2018 | Stockman |
| 10,224,517 B2 | | 3/2019 | Kimura |
| 10,236,492 B2 | | 3/2019 | Miyake |
| 10,320,025 B2 | | 6/2019 | Hiroki et al. |
| 10,388,939 B2 | | 8/2019 | Urano et al. |
| 10,686,167 B2 | | 6/2020 | Goto et al. |
| 2002/0017700 A1 | | 2/2002 | Mori et al. |
| 2002/0127362 A1 | | 9/2002 | Jansen et al. |
| 2006/0210841 A1 | | 9/2006 | Wallace et al. |
| 2008/0241677 A1 | | 10/2008 | Garcia Alberola |
| 2008/0241680 A1 | | 10/2008 | Lee et al. |
| 2009/0291361 A1 | | 11/2009 | Scorziello |
| 2013/0295434 A1 | * | 11/2013 | Ayub .............. H01M 2/1061 |
| | | | 429/157 |
| 2014/0212695 A1 | | 7/2014 | Lane et al. |
| 2015/0044511 A1 | | 2/2015 | Kim et al. |
| 2015/0194697 A1 | | 7/2015 | Hung et al. |
| 2015/0311495 A1 | | 10/2015 | Wang |
| 2016/0156012 A1 | | 6/2016 | Takahashi et al. |
| 2016/0218387 A1 | | 7/2016 | Tajima |
| 2016/0233695 A1 | | 8/2016 | Hopfer, III et al. |
| 2017/0018784 A1 | | 1/2017 | Yun et al. |
| 2017/0025669 A1 | | 1/2017 | Urano et al. |
| 2017/0079139 A1 | | 3/2017 | Wu |
| 2018/0062197 A1 | | 3/2018 | Thiel et al. |
| 2018/0083233 A1 | | 3/2018 | Young et al. |
| 2018/0175346 A1 | | 6/2018 | Schmid-Schoenbein |
| 2018/0261900 A1 | | 9/2018 | Kim et al. |
| 2018/0301741 A1 | | 10/2018 | Kumar et al. |
| 2019/0088979 A1 | | 3/2019 | Grady et al. |
| 2019/0090350 A1 | | 3/2019 | Kumar |
| 2019/0237832 A1 | | 8/2019 | Ju et al. |
| 2019/0305303 A1 | | 10/2019 | Yebka et al. |
| 2019/0326647 A1 | | 10/2019 | Kawai et al. |
| 2020/0127259 A1 | | 4/2020 | Yoshida et al. |
| 2020/0243808 A1 | | 7/2020 | Harutyunyan et al. |
| 2020/0245495 A1 | | 7/2020 | Yi et al. |
| 2020/0403566 A1 | | 12/2020 | Yamaai et al. |

FOREIGN PATENT DOCUMENTS

| | | |
|---|---|---|
| WO | 08023199 A1 | 2/2008 |
| WO | 17209052 A1 | 12/2017 |

OTHER PUBLICATIONS

Inventus Power, "Conformal Wearable Batteries Safe, 'Flexible, Wearable Power Designed to Increase Mission Effectiveness'," visited on Nov. 4, 2020 at <https://inventuspower.com/conformal-wearable-batteries/>, pp. 3.

Rebecca Cragun, et al., "Li-Ion Conformal Wearable Battery," EaglePicher Technologies, LLC visited on Feb. 9, 2020 at <http://www.powersourcesconference.com/Powerp%20Sources%202018%20Digest/docs/34-2.pdf>, pp. 577-580.

Eaglepicher Technologies, "Rechargeable Conformal Battery", visited on Feb. 9, 2020 at <https://www.eaglepicher.com/sites/default/files/SLB-101%20061419.pdf>, pp. 2.

* cited by examiner

HOUSING FOR A CONFORMAL WEARABLE BATTERY

CROSS-REFERENCE TO RELATED APPLICATIONS

This application is a continuation-in-part of U.S. patent application Ser. No. 17/038,287 filed on Sep. 30, 2020, which is incorporated by reference in its entirety. This application is related to U.S. application Ser. No. 17/086,132 filed on Oct. 30, 2020, entitled "Impact Absorbing Member for a Conformal Wearable Battery," U.S. application Ser. No. 17/085,864 filed on Oct. 30, 2020, entitled "Flexible Battery Matrix for a Conformal Wearable Battery," and U.S. application Ser. No. 17/085,928 filed on Oct. 30, 2020, entitled "Flexible Battery Matrix for a Conformal Wearable Battery," which are being filed concurrently with this application and all of which are herein incorporated by reference in their entirety.

FIELD

Aspects described herein generally relate to electrical power storage systems. More specifically, aspects of this disclosure relate to sealed housings for a matrix of battery cells.

BACKGROUND

Batteries may come in different shapes and sizes depending on their intended usage. Some batteries may be arranged as packages of battery cells that are assembled together to provide a predetermined power output. These battery packages may be arranged in a durable and sealed housing to protect the batteries from damage. In some instances, the battery packages may be desired to flex or bend to accommodate their intended usage.

In addition, portable battery systems may be utilized to provide mobile and/or remote location electrical power. Integrated communications equipment and/or weapons gear utilized, for example, by law enforcement and/or military personnel requires increasingly high levels of power storage carried proximate the user's body. Methods of increasing power storage capability in a device, such as a conformal wearable battery (CWB) is to include additional battery cells and/or use larger battery cells. However, these solutions may unacceptably increase the size and/or weight of the resulting systems, reducing mobility.

As such, a need has been recognized within the mobile electrical power storage industry for increasing power capacity while improving an overall user safety of these systems while simultaneously reducing their size and weight.

BRIEF SUMMARY

Aspects of the disclosure provide solutions that address and overcome technical problems associated with charging batteries encased in hermetically sealed packages.

Additional aspects of this disclosure may relate to a conformal wearable battery that includes a plurality of battery cells arranged in a grid-like pattern, where the plurality of battery cells have a positive terminal and a negative terminal to provide electricity through a transfer of electrons between the positive terminal and negative terminal, a housing with an interior cavity that receives the plurality of battery cells, a conductive region coupled to one or more of the positive terminal and the negative terminal, where the electricity is provided from one or more of the plurality of battery cells to the conductive region, and a contact component having a front portion and a rear portion, where the contact component comprises an electrically conductive material. The front portion of the contact component may include an outward facing surface and a perimeter region surrounding the outward facing surface, where the outward facing surface may be accessible from outside of the interior cavity of the housing and the rear portion may have an inward facing surface. The contact component may be connected to the conductive region. The perimeter region of the outward facing surface of the contact component may be secured to the housing forming a sealed edge to prevent ingress of liquid into the interior cavity. The conformal wearable battery may also include a contact carrier that encases the rear portion of the contact component, where the contact carrier is also secured to the housing. The contact carrier may be secured to the housing between a rear surface of a sidewall of the housing and a rear flange that is spaced rearward of the rear surface. The housing may include a first plug that extends from the rear surface of the sidewall through an opening in the contact carrier to the rear flange of the housing. The electrically conductive material of the contact component may be formed from at least one material selected from brass, gold, copper, silver, aluminum, steel, or a combination thereof. The perimeter region may include a groove, and the rear portion may include a textured region and a threaded female element. The textured region may include a plurality of angled gear teeth. The contact component may also include an opening that receives a conductive element to create a connection between the conductive region and the contact component.

Still other aspects of this disclosure may relate to a conformal wearable battery that includes: (a) a plurality of battery cells comprising a positive terminal and a negative terminal to provide electricity through a transfer of electrons between the positive terminal and negative terminal; (b) a housing that includes a first shell and a second shell, where the first shell may connect to the second shell to form an interior cavity that receives the plurality of battery cells; (c) a conductive region coupled to one or more of the positive terminal and the negative terminal, where the electricity is provided from one or more of the plurality of battery cells to the conductive region; (d) a first contact carrier that secures a first electrically conductive contact component, where the first contact carrier is secured to the first shell; and (f) the first contact component having a front portion and a rear portion. The front portion of the first contact component may include an outward facing surface and a perimeter region surrounding the outward facing surface, where the outward facing surface is accessible from outside of the interior cavity of the housing. The first contact component is connected to the conductive region. The first contact carrier may be secured to the housing between a first rear surface of a first sidewall of the first shell and a first rear flange that is spaced rearward of the first rear surface. A first plug may extend from the first rear surface of the first sidewall through an opening in the first contact carrier to the first rear flange of the first shell, where the first plug, the first rear flange, and the first sidewall may be a single unitary member. A sidewall of the first shell may surround the perimeter region of the first contact component, and the first contact carrier may surround a textured region of the first contact component. The first rear flange may include an opening to allow access to an inward facing surface of the first contact component. A connector plate configured to receive a connector may be secured between a second rear surface of a second sidewall of the first shell and a second rear flange. In addition, a second plug may extend from the second rear surface through an opening in the connector plate to the second rear flange. The CWB may also include a second contact carrier, where the first contact carrier secures the first contact component and a second electrically conductive contact component. The second contact carrier may secure a third electrically conductive contact component and a fourth electrically conductive contact component.

Other aspects of this disclosure may relate to a system that includes: (a) an electronic component to provide an electrical signal, wherein the electronic component comprises a plurality of battery cells; (b) a housing that includes an interior cavity that receives the electronic component; (c) a conductive region coupled to the electronic component, where the electrical signal is provided from the electronic component to the conductive region; and (d) an electrically conductive contact component having a front portion and a rear portion. The front portion of the contact component may include an outward facing surface and a perimeter region surrounding the outward facing surface. The outward facing surface may be accessible from outside of the interior cavity of the housing, and the rear portion may have an inward facing surface. The contact component may be connected with the conductive region. The front portion may be partially encased by a first material that forms a sidewall of the housing, and the rear portion may be partially encased by a second material, where the first material may have a lower durometer than the second material. The electronic component may comprise a battery-charging controller and a computing processor. The perimeter region of the contact component may include a groove, and the rear portion of the contact component may include a textured region and a threaded female element. The contact component may include a threaded opening that receives a conductive element to create a direct connection between the conductive region and the contact component. The rear portion of the contact component may be secured to a contact carrier that is formed from the second material.

Yet still other aspects of this disclosure may relate to a conformal wearable battery that includes: (a) a plurality of battery cells arranged in a grid-like pattern, where the plurality of battery cells includes a positive terminal and a negative terminal to provide electricity through a transfer of electrons between the positive terminal and negative terminal; and (b) a housing that includes: (1) a first shell formed from a first member having a first plurality of rigid regions and a second member that has a first flexible region located between a first rigid region and a second rigid region of the first plurality of rigid regions, where the first shell includes a front wall with an outward facing surface formed from outward facing surfaces of the first plurality of rigid regions and an outward facing surface of the second member, and (2) a second shell attached to the first shell, wherein the second shell includes a third member having a second plurality of rigid regions and a fourth member that has a second flexible region located between a first rigid region and a second rigid region of the second plurality of rigid regions. The second shell may have an outward facing surface formed from outward facing surfaces of the second plurality of rigid regions and an outward facing surface of the second member, where the first shell may connect to the second shell to form an interior cavity that receives the plurality of battery cells. The first member may be formed from a first material, and the second member may be formed from a second material, where the first material has a hardness that is greater than a hardness of the second material. The third member may be formed from the first material, and the fourth member may be formed from the second material. The first material may be formed from a polycarbonate, and the second material may be formed from a thermoplastic elastomer. The second member may be molded onto the first member to form the first shell. Additionally, the first rigid region of the first plurality of rigid regions may include a first outward facing surface, a first inward facing surface, and a first edge region along a majority of a perimeter of the first rigid region extending between the first outward facing surface and the first inward facing surface. The first edge region may include a first edge surface and a second edge surface, where the first edge surface and the second edge surface extend in different directions. The second member may have a second edge region that has a complementary structure to the first edge region such that the first member and the second member are substantially coplanar on adjacent surfaces of the first edge region.

Still additional aspects of this disclosure may relate to a housing for a plurality of battery cells arranged in a grid-like pattern, where the housing includes: (a) a first shell having a first member having a plurality of rigid regions and a second member that has a flexible region located between a first rigid region and a second rigid region of the plurality of rigid regions, where a first wall of the first shell has an outward facing surface formed from outward facing surfaces of the plurality of rigid regions and an outward facing surface of the second member and (b) a second shell attached to the first shell forming an interior cavity between the first shell and the second shell. The first member may be formed as a unitary member, and the second member may be molded onto the first member. In addition, the first member may be formed from a first material, and the second member may be formed from a second material. The first material may have a first hardness, and the second material may have a second hardness, where the first hardness may be greater than the second hardness. The plurality of rigid regions may be arranged in an array with the plurality of rigid regions in both a horizontal direction and a vertical direction that correspond to the grid-like pattern of the plurality of battery cells. Each rigid region of the plurality of rigid regions may be spaced apart from an adjacent rigid region and is connected to the adjacent rigid region by a channel. The channel may act as a living hinge, and the channel may have a thickness that is less than a thickness of the first rigid region. The first rigid region of the plurality of rigid regions may include a first outward facing surface, a first inward facing surface, and a first edge region along a majority of a perimeter of the first rigid region extending between the first outward facing surface and the first inward facing surface. The first edge region may include a first edge surface that extends substantially perpendicular to the first outward facing surface and a second edge surface has a portion that extends substantially perpendicular to the first edge surface. The second edge surface may include a curved portion. A thickness of the first rigid region may be substantially the same as a thickness of the flexible region, where the thickness of the first rigid region may be measured at a center of the first rigid region and the thickness of the flexible region may be measured at a location adjacent a first edge region of the first rigid region. The second shell may include a third member having a second plurality of rigid regions and a fourth member that has a second flexible region located between a first rigid region and a second rigid region of the second plurality of rigid regions. A first wall of the second shell may have an outward facing surface formed from outward facing surfaces of the plurality of rigid regions and an outward facing surface of the second member. The second member may include a plurality of horizontal grooves and a plurality of vertical grooves.

Additional aspects of this disclosure may relate to a housing for a plurality of battery cells arranged in a grid-like pattern, where the housing includes a first shell having a first member having a plurality of rigid regions and a second member that has a flexible region located between a first rigid region and a second rigid region of the plurality of rigid regions, and wherein a first wall of the first shell has an outward facing surface formed from outward facing surfaces of the plurality of rigid regions and an outward facing surface of the second member, where the plurality of rigid regions are arranged in an array with the plurality of rigid regions in both a horizontal direction and a vertical direction that correspond to the grid-like pattern of the plurality of battery cells and each rigid region of the plurality of rigid regions are spaced apart from an adjacent rigid region and is connected to the adjacent rigid region by a channel. The first member may be formed as a unitary member, and the second member may be molded onto the first member. The first member may be formed from a first material, and the second member may be formed from a second material. The first material may have a first hardness, and the second material may have a second hardness, where the first hardness is greater than the second hardness.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
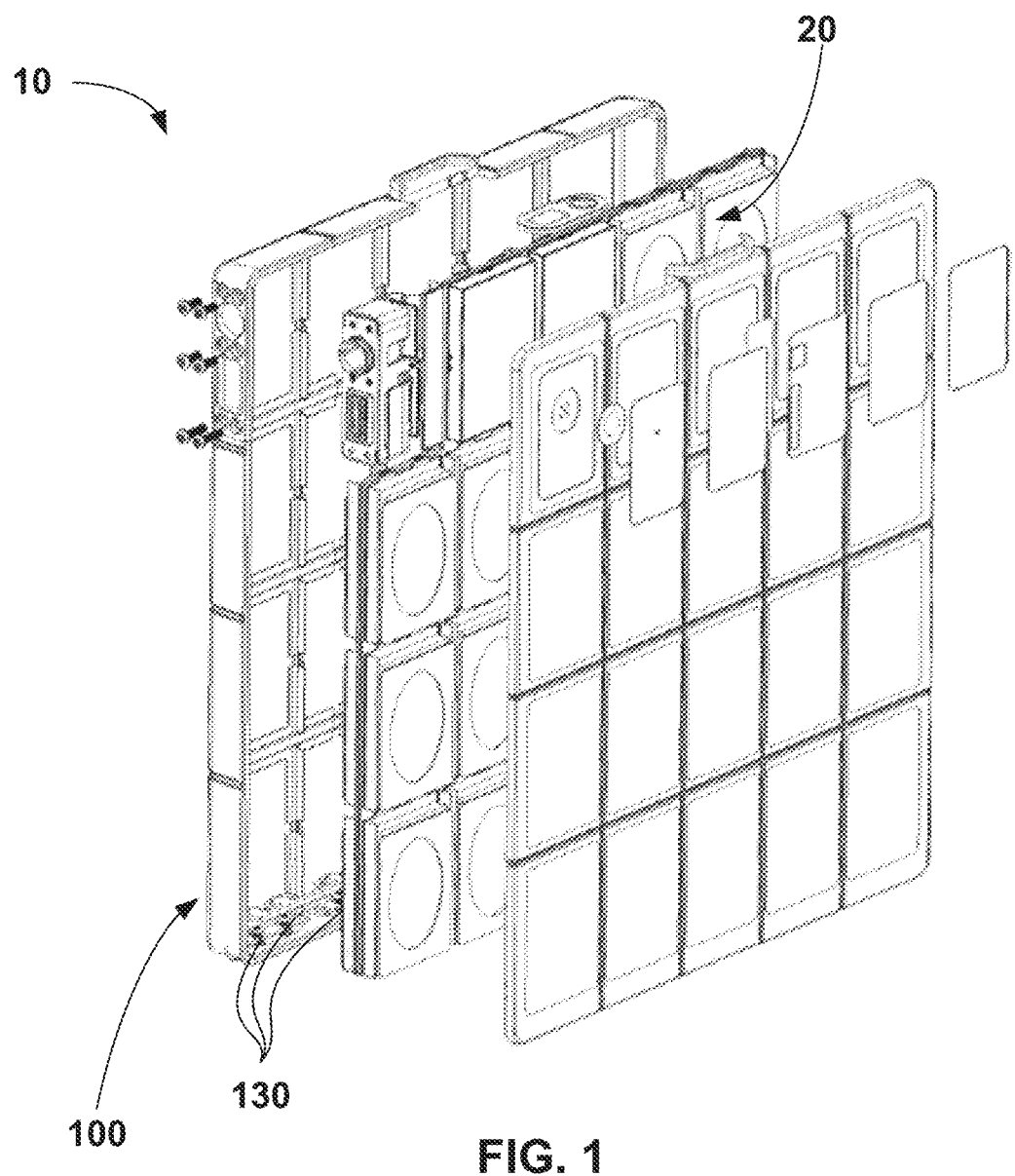
FIG. 1 illustrates an exploded perspective view of an exemplary conformal wearable battery (CWB) according to aspects described herein.

In the following description of various illustrative arrangements, reference is made to the accompanying drawings, which form a part hereof, and in which is shown, by way of illustration, various arrangements in which aspects of the disclosure may be practiced. It is to be understood that other arrangements may be utilized, and structural and functional modifications may be made, without departing from the scope of the present disclosure. The drawings may not be shown to scale.

It is noted that various connections between elements are discussed in the following description. It is noted that these connections are general and, unless specified otherwise, may be direct or indirect, and that the specification is not intended to be limiting in this respect.

For a product and/or case in which a sealed fit is a useful feature, typical sealing techniques that use glue, adhesives, welding, or soldering may not always form a robust seal especially around complex shapes. When a seal's integrity is compromised, contaminants may breach the seal and cause damage within the product. The seal's integrity may be compromised by cracks, voids, stress fractures, and/or other defects associated with or caused by the sealing techniques within a material associated with the seal. For example, a glue or an adhesive may lose adhesion to the material associated with the seal, stress fractures in the material may be caused by heat associated with welding or soldering, or a void leading to a breach of the seal may form when performing soldering or welding. Heat from welding or soldering techniques may cause the material of the case to liquify and flow at the location of the desired seal, thereby preventing a reliable seal from being formed. As a result, attempts to seal an electrical conductor, for example, passing through a material enclosing a product using typical sealing techniques may result in failure of the seal, breaching of the seal by fluid and/or contaminants, and/or damage to the product protected by the seal.

Disclosed herein is a method of installing an electrically conductive component passing through an exterior wall of a sealed case or housing by an insert molding process. An insert molding process may provide greater reliability and integrity of the seal, as well as an improved cosmetic appearance of the seal compared to typical sealing techniques. The electrically conductive component may include a plurality of knurled regions for making a friction fit with a wall of the molded case to create a seal between the electrically conductive component and the material of the molded case, which may be a polymeric material. The friction fit produced by the insert molding process may avoid the above-mentioned failure modes associated with sealing a space between an electrically conductive component and an edge of a material of a case with glue, adhesive, welding, or soldering. For example, the insert molding process may avoid application of high levels of heat at the joint between the electrically conductive component and the material of the case as may be applied in a soldering or welding process.

The seal produced between the electrically conductive component and the material of the molded case may satisfy requirements of an International Electrotechnical Commission (IEC) IP67 rating for preventing dust and water ingress to the case and creating a water-tight fit between the electrically conductive component and the case in which the electrically conductive component is disposed. The IP67 rating is specified by the Ingress Protection Code (IP Code) IEC standard 60529. The equivalent European standard is EN 60529. The IP Code also may be referred to as the International Protection Code. The IP Code classifies and rates a degree of ingress protection provided by mechanical casings and electrical enclosures for electronic equipment against intrusion, dust, accidental contact, and liquid (e.g., water). In the IP67 rating, the first digit (i.e. '6') specifies a level of protection offered against ingress of solid objects, while the second digit (i.e. '7') specifies a level of protection offered against ingress of liquids. The larger the value of the digit specifying the level of protection, the greater the amount of protection offered. For example, an IP67 rating specifies total protection against dust ingress and protection against short periods of immersion in water. An IP68 rating specifies dust resistance and immersion in 1.5 meters of freshwater for up to 30 minutes duration.

A reliable seal, for example, an IP67 rated seal, may be desirable and beneficial for protection and maintenance of batteries enclosed in environmentally protected housings. Such a battery for powering electronic devices in outdoor environments, for example, in dusty, sandy, rainy, and/or wet environments, may fail early if contaminants such as water, dust, dirt, and/or sand get into the battery enclosed in the housing. A rechargeable conformal wearable battery (CWB) assembly may be worn by a user to power electronic devices that the user carries. The CWB assembly may be subjected to environmental conditions that may cause the CWB (and its housing) to physically deform or bend while also being exposed to moisture. A reliable seal may facilitate longer battery life and utility for the user regardless of environmental conditions that the CWB may be subjected.

A CWB assembly may include an array of a first quantity of battery cells disposed adjacent to one another in a horizontal direction and a second quantity of battery cells disposed adjacent to one another in a vertical direction. The array of battery cells may be arranged in a grid-like pattern. Each of the battery cells may be separate from other battery cells. A battery cell as described herein may include a plurality of individual battery cell elements that are electrically connected together to form a compound battery cell that electrically performs as a single unit. Each of the battery cells may be physically connected to adjacent battery cells by flexible elements (e.g., a flexible printed circuit board), thereby facilitating a surface outline or shape of the array of battery cells to generally conform to a surface outline or shape of a user wearing the CWB assembly. One or more of the battery cells may include a positive-charge electrical terminal and a negative-charge electrical terminal that are electrically connected with the battery cell within an interior of the battery cell and provide electrical power to electrical devices disposed exterior to the battery cell. Electrical terminals of a plurality of the battery cells in the array of battery cells may be connected together to route electrical current through the plurality of the battery cells and a set of positive-charge and negative-charge electrical terminals that are shared among the plurality of the battery cells. The positive-charge electrical terminal and the negative-charge electrical terminal may provide an electrical current that passes through an electrically conductive path, for example, through an electronic device, via transfer of electrons through the electrically conductive path between the positive-charge electrical terminal and the negative-charge electrical terminal on the exterior of the housing. The CWB assembly may include a set of positive-charge and negative-charge electrical terminals that are shared among the plurality of the battery cells of the array of battery cells. The plurality of the battery cells may be electrically coupled together, for example, in series, in parallel, or in groups of series connected battery cells connected in parallel, etc.

The CWB housing may be formed from molded components. The molded housing components may form a sealed case. Each of the housing components may be formed by a molding process, for example, an injection molding process. The molded casing may be formed of a polymeric material, for example. The casing may be sealed to prevent ingress of solid material and/or liquid material, for example, according to an IP67 rating, IP68 rating, or other ingress protection rating. The casing may feature a seam between two components or portions of the casing that is sealed to encase the battery cell within the casing. The positive-charge terminal and the negative-charge terminal may each include a conductive contact component that passes between the interior of the CWB housing and the exterior of the CWB housing. The conductive region may include a flexible circuit, wiring or PCBA that is affixed and electrically connected to the battery cells in an interior of the housing at one end, and electrically connected to a contact component that passes through a wall of the casing, and electrically couples with electrical devices at an exterior of the CWB housing. The details of the housing are described in more detail below.

The contact component may include a textured region on an exterior of the contact component that is adjacent to and/or interfaces with the wall of the housing. In some examples, the textured region may include two separate knurled areas and a recessed groove between the two knurled areas. The contact component may include a threaded element that mates with a corresponding threaded conductive element that electrically connects to conductive region (i.e. flexible circuit, wiring) of the battery cells. The threaded element of the contact component may include a female threaded element. The female threaded element of the contact component may mate with a corresponding male threaded conductive element. A thread pitch or thread count of the threaded element of the contact component may match a thread pitch or thread count of the corresponding threaded element of the conductive element. The contact component may be physically and electrically accessible outside of the housing, for example, at an exterior of the cell housing. For example, the contact component may have an outward facing surface that is accessible outside housing. The contact component may be in direct physical and electrical contact with the conductive region inside the housing. The textured region of the exterior of the contact component may form a seal at an interface with the casing, for example, at a wall of the casing that prevents ingress of solids and/or liquids into the interior region of the casing according to an IP rating.

Figure 2:
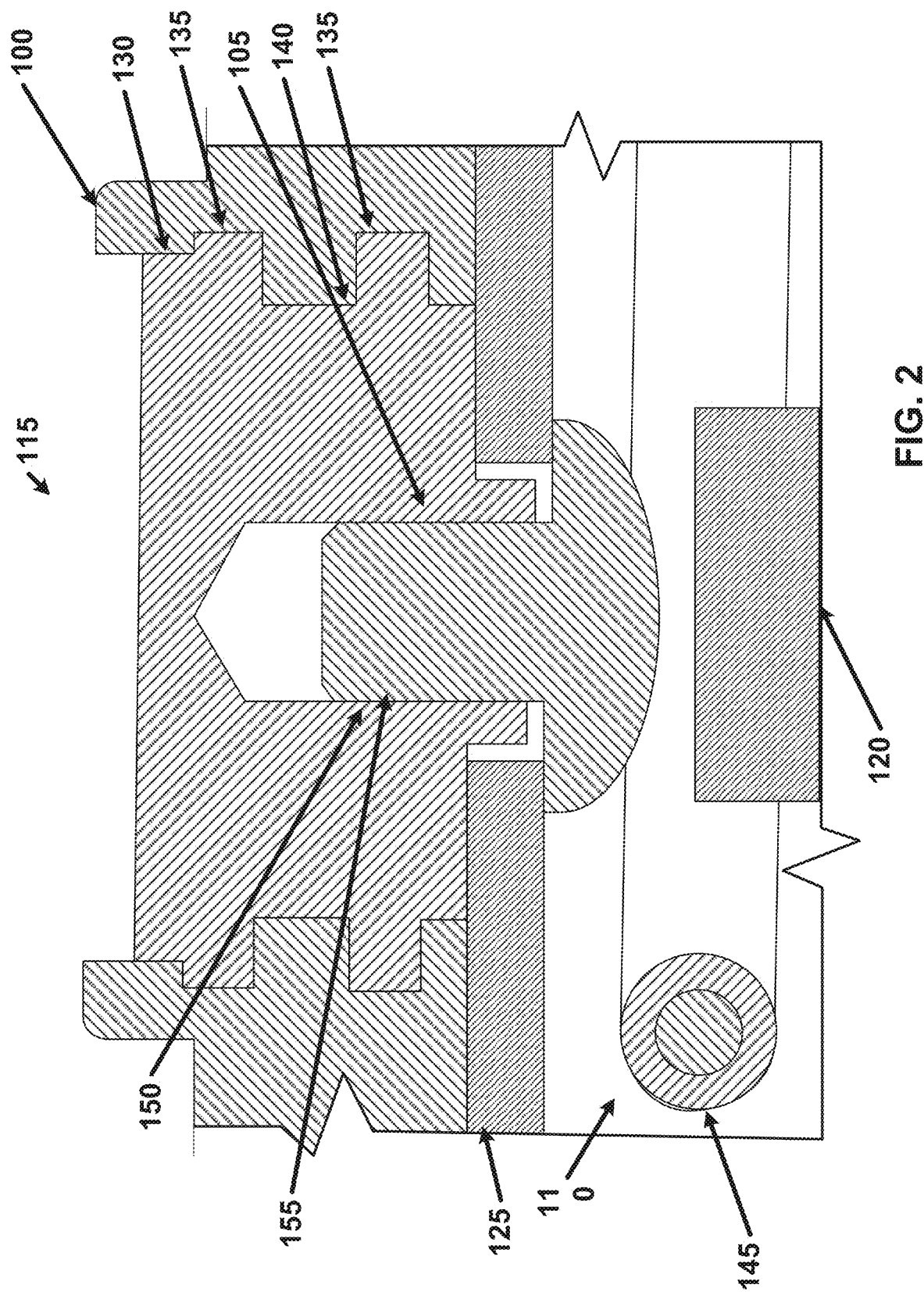
FIG. 2 illustrates a cross-sectional view of an electrical contact region of an exemplary CWB housing according to aspects described herein.

FIG. 1 illustrates an exploded perspective view of an exemplary conformal wearable battery (CWB) 10 according to aspects described herein. FIG. 2 illustrates a cross-section view of an electrical contact region of an exemplary CWB housing 100. The battery cells 20 may be installed into the housing 100. An electrically conductive fastener 105 (e.g., a screw or a bolt) may provide an electrically conductive path from an interior 110 of the CWB housing 100 to an exterior 115 of the CWB housing 100. A battery cell terminal 120 may be electrically connected with one end (e.g., a head) of the electrically conductive fastener 105 in the interior 110 of the CWB housing 100. The electrically conductive fastener 105 may have a shaft portion 150 that passes through an opening in a printed circuit board assembly (PCBA) 125 and mates with a corresponding hole 155 in a contact component 130 in electrical and physical communication with an exterior 115 of the CWB housing 100. Alternatively, the PCBA may be a flexible circuit board assembly or maybe, at least partially replaced by a wiring harness. The shaft portion 150 of the electrically conductive fastener 105 may include a threaded region (e.g., a male threaded region) that mates with a corresponding threaded region (e.g., a female threaded region) of the contact component 130. The contact component 130 may include two or more knurled regions 135 that are separated by one or more groove regions 140. Diameters and/or widths of the two or more knurled regions 135 may be equal or different. Diameters and/or widths of the one or more groove regions 140 may be equal or different. Dimensions associated with different aspects and regions of the contact component 130 may vary. A difference in diameter between a groove region 140 and a knurled region 135 may be within a range of one to three (1.0 to 3.0) times a width of a knurled region 135, for example. A width of the groove region 140 may be within a range of one-half to four (0.5 to 4.0) times a width of a knurled region 135, for example. A wire 145 may electrically connect with an interior side of the PCBA 125 on one or more of the sides of the electrically conductive fastener 105.

While the preceding example of FIG. 1 refers to a female threaded element of the contact component 130 for receiving a male conductive element 105, the disclosure is not so limited. Rather, the male and female elements may be reversed in that the contact component 130 may consist of the male element and the conductive region may be secured using a female threaded element. Moreover, while some embodiments may describe a threaded means for mating the male and female element, in other embodiments the means for mating may comprise other methods available to those of ordinary skill such as friction fitting, an expandable/collapsible that latches the two elements together, or other mating techniques.

Figure 3:
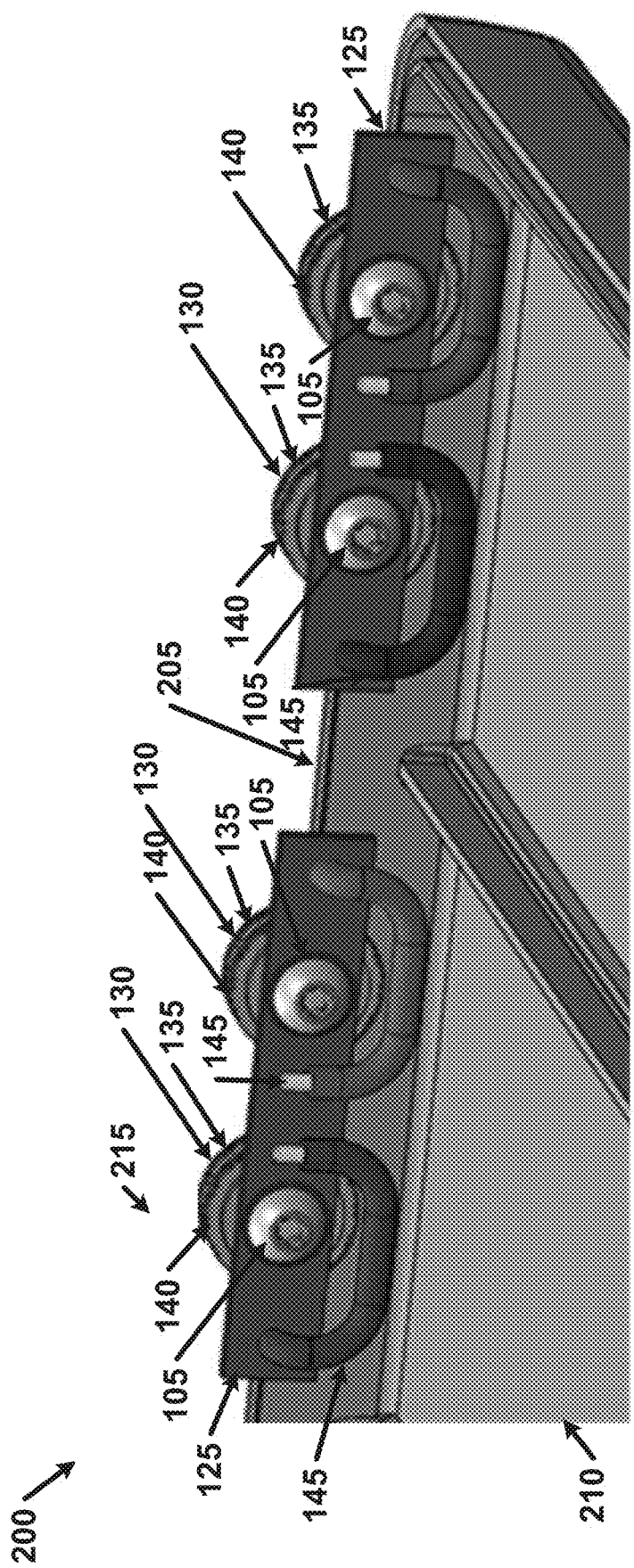
FIG. 3 illustrates a partial perspective view of the electrical contact region of an exemplary CWB housing according to aspects described herein.

FIG. 3 illustrates a perspective view of the electrical contact region of one lower housing 205 of the exemplary CWB housing 100. The lower housing 205 may be illustrated as a cut-away for ease of viewing the contact components 130 embedded within the wall of the lower housing 205. The lower housing 205 may comprise the contact components 130 seated and encased in the exterior wall after an injection molding process. The material of the molded walls may be formed by the injection molding process to closely and tightly fit the shape of the knurled regions 135 and the groove regions 140 of the contact components 130. The lower housing 205 may be formed by an injection molding process in which the contact components 130 are positioned and fixed in place in a mold prior to forming the lower housing 205 in the mold. When the material for the lower housing 205 is injected into the mold, the material flows around the knurled regions 135 and the groove regions 140 of the contact components 130 forming a mechanical lock around the contact components 130 after the material solidifies.

An upper housing (not shown) that mates with the lower housing 205 may be seated over the lower housing 205 of the CWB housing 200 and fit together during assembly. A seam between the upper housing and the lower housing 205 may be formed to seal (e.g., by laser welding) the upper housing and lower housing 205 of the CWB housing 200 to each other, while the knurled regions 135 and the groove regions 140 of the contact components 130 may be fully encased and sealed within the lower housing 205 of the CWB housing 200.

One or more of the electrically conductive fasteners 105 may pass through a hole in a corresponding PCBA 125, with a head end of the electrically conductive fasteners 105 disposed on a side of the PCBA 125 facing an interior 210 of the CWB housing 100, and an opposite (e.g., threaded or shaft end) of the electrically conductive fasteners 105 inserted through the PCBA 125 and into and/or mated with corresponding contact components 130 on an opposite side of the PCBA 125 that faces the exterior 215 of the CWB housing 100. The electrically conductive fasteners 105 may secure the PCBA 125 against the inward facing surface of the contact components 130. The electrically conductive fasteners 105 may electrically connect an electrically conductive plate and/or electrical trace of the PCBA 125 with a corresponding interior-facing side of the contact component 130. One end of the wires 145 may be electrically connected to electrically conductive traces and/or electronic circuitry disposed on the PCBA 125. The one or more of the wires 145 may be directly and/or electrically connected to the fasteners 105. In some examples (not shown), the PCBA 125 may be replaced by a washer to which a corresponding end of a wire 145 is connected. An opposite end of the wires 145 may be connected to one of a positive battery cell terminal, negative battery cell terminal, protection circuitry, data circuitry, clock circuitry, or other circuitry associated with the battery cells 20. Circuitry associated with the battery cells 20 may include battery charging control circuitry, for example. The wires 145 may carry electrical current and/or data signals between the battery cell and/or associated circuitry within the interior 210 of the CWB housing 100 and the contact component accessible on the outside 215 of the CWB housing 100. Dimensions of the various components shown in FIGS. 1-3 may vary and may have different relative scales than shown in the drawings without departing from the disclosure herein.

Figure 4A:
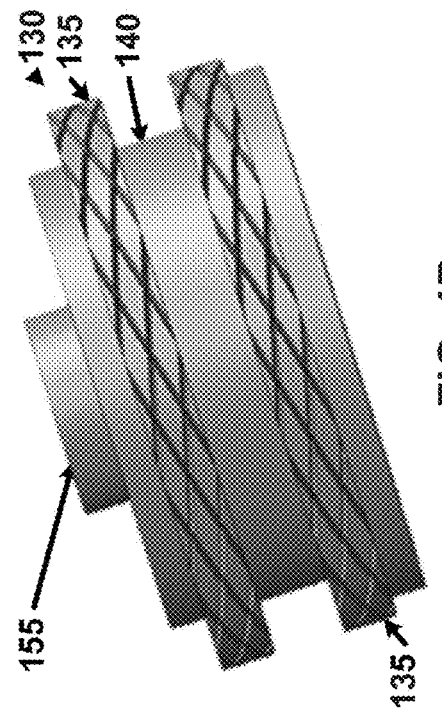
FIGS. 4A and 4B illustrate perspective views of an exemplary contact component from different vantage points according to aspects described herein.
Figure 4B:
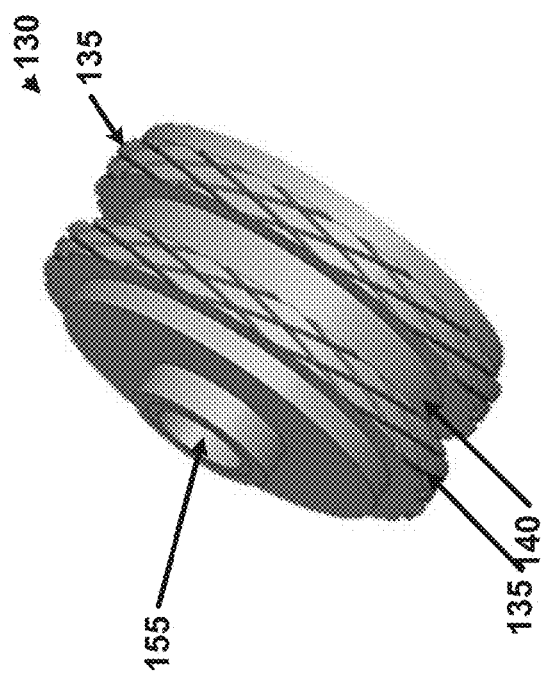
Figure 5A:
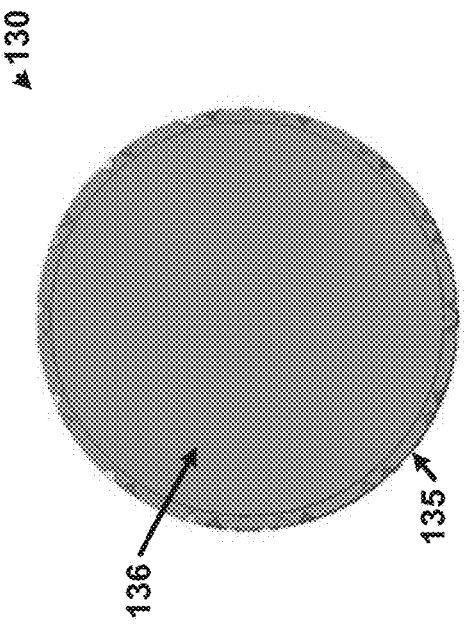
FIGS. 5A and 5B illustrate side and front views of an exemplary contact component according to aspects described herein.
Figure 5B:
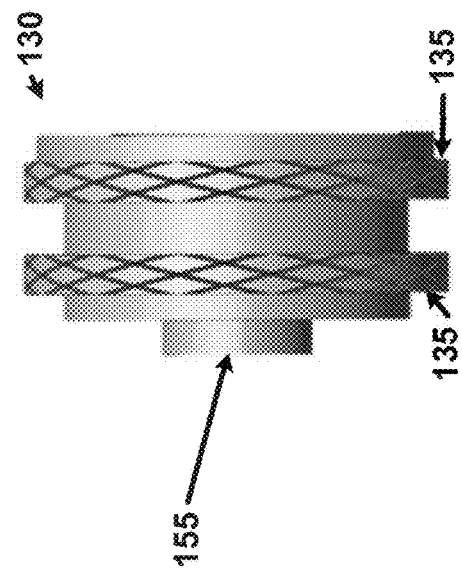

FIGS. 4A, 4B, 5A, and 5B illustrate views of an exemplary contact component 130 from different vantage points. A plurality of knurled regions 135, for example, two as shown in FIGS. 4A, 4B, and 5A, may be separated by one or more groove regions 140. The knurled regions 135 of the contact component 130 may have a greater diameter than the one or more groove regions 140. A width of the knurled regions 135 may be greater than, the same as, or less than a width of the one or more groove regions 140. The knurled regions 135 may include crossed lines that form a surface texture of the knurled regions 135. The crossed lines may be formed by machining, drilling, laser cutting, or milling operations performed on the contact component 130. The crossed lines may create triangular and/or diamond-shaped regions in the knurled regions 135. The crossed lines of the knurled regions 135 and the one or more groove regions 140 may assist with the adhesion of the material with which the molded CWB housing is formed to the contact component 130. When the contact component 130 is inserted into the mold for the CWB housing 100 and the material for the lower housing 205 is flowed through the interface between the curved exterior surface of the contact component 130 (e.g., comprising the knurled regions 135 and the one or more groove regions 140) and an edge of the CWB housing 100, the material may enter and solidify within at least a portion of the cross-hatched grooves of the knurled regions 135 and the groove region 140 to form a solid attachment to and high quality seal (e.g., IP67, IP68, or better) with the curved exterior surface of the contact component 130.

The outward facing surface 136 may interface with an external electrical device that uses the CWB 10.

At least one advantage of the aforementioned method is that a high-quality friction fit is produced without exposing the materials to glue, adhesive, welding, and/or soldering. For example, by avoiding soldering and welding, the aforementioned process avoids application of high levels of heat at the joint between the electrically conductive component and the edge of the material of the case as may be applied in a soldering or welding process. Unlike systems that may rely upon an application of heat, the aforementioned embodiment is an improvement because, inter alia, it creates a high-quality seal without relying upon an application of heat or a messy, potentially manual application of glue to join two or more pieces of a casing/housing.

The contact component 130 may have features and characteristics that vary from those illustrated in FIGS. 4A, 4B, 5A, and 5B without departing from the disclosure herein.

The material of the contact component 130 may comprise brass, gold, copper, silver, aluminum, steel, or other electrically conductive material or combination of one or more electrically conductive materials. Relative dimensions of one or more portions of the contact component 130 may vary from those shown. The hole 155 may be optionally included or omitted. The hole 155 may comprise a fitting portion configured to mate with the electrically conductive fastener 105. For example, the hole 155 may comprise threaded walls that mate with a threaded shaft of the electrically conductive fastener 105. The hole 155 and the shaft of the electrically conductive fastener 105 may both have a same or compatible thread count or thread pitch. The hole 155 may be replaced by a protrusion, shaft, bolt, or the like, and the mating electrically conductive fastener 105 may be replaced by a socket, nut, crimp, or other fastener that mates with a protrusion, shaft, bolt, or the like, for example, by having corresponding thread pitch or thread count. The hole 155 or replacement may facilitate robust, secure, and reliable attachment of the contact component to interior components, for example, electrical conductors, electrical or electronic circuits, mechanical components such as screws that hold components such as PCBAs in position, etc.

Figure 6:
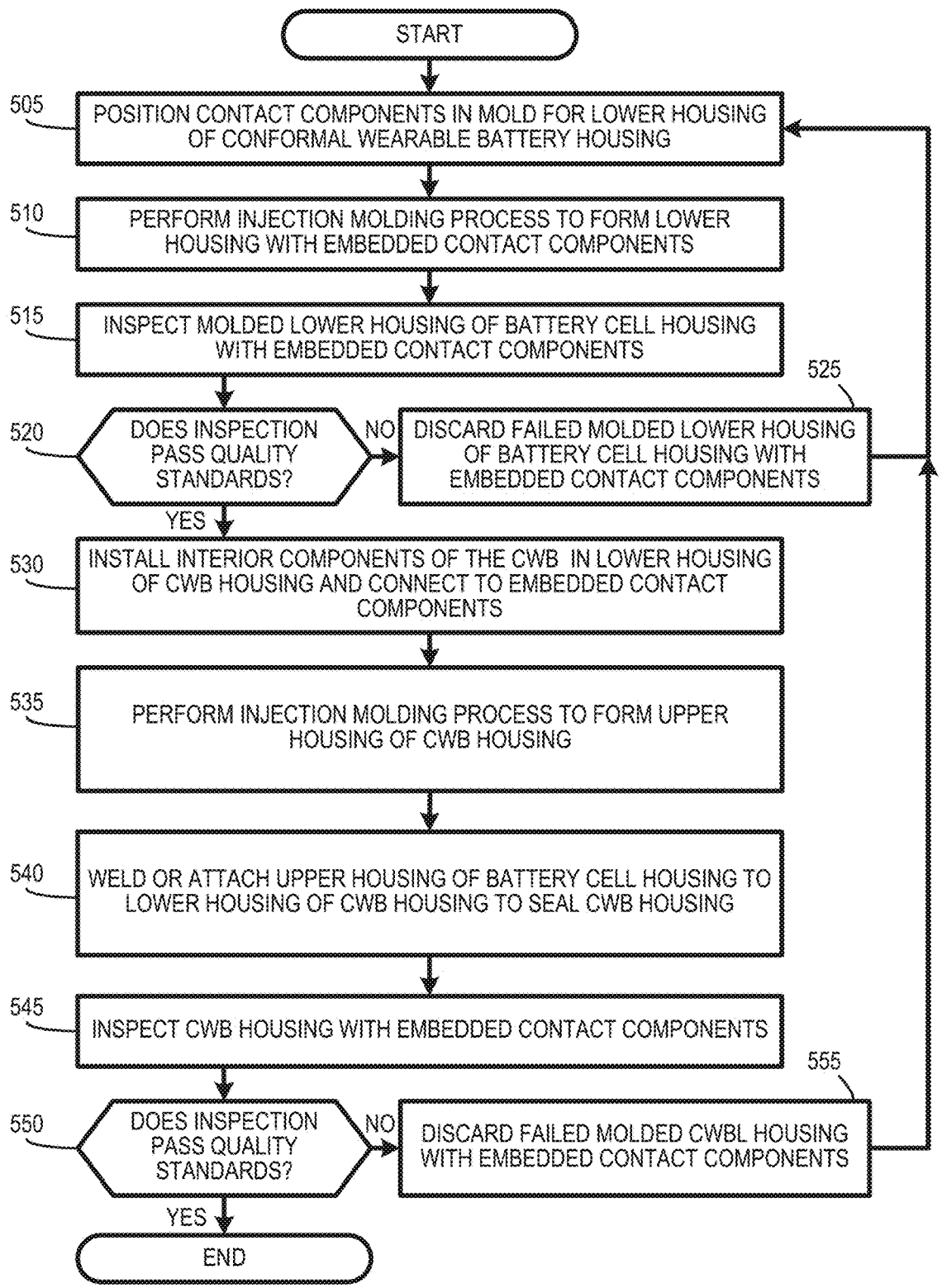
FIG. 6 illustrates a flowchart of exemplary assembly steps performed to encase the contact component into a portion of the CWB housing before the CWB housing is sealed closed in a molding process according to aspects described herein.
Figure 7:
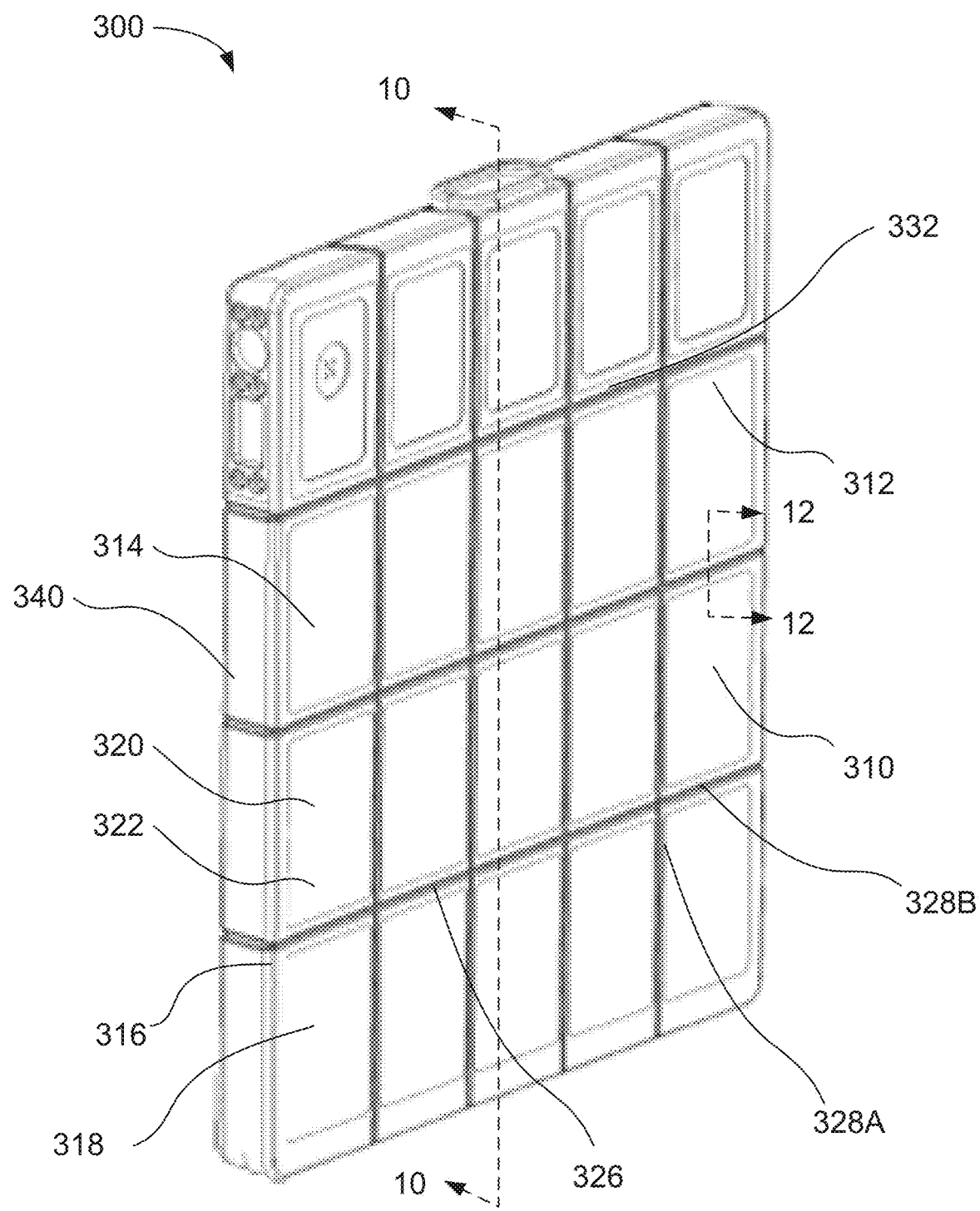
FIG. 7 illustrates a front perspective view of another exemplary housing of the CWB of FIG. 1 according to aspects described herein.
Figure 8:
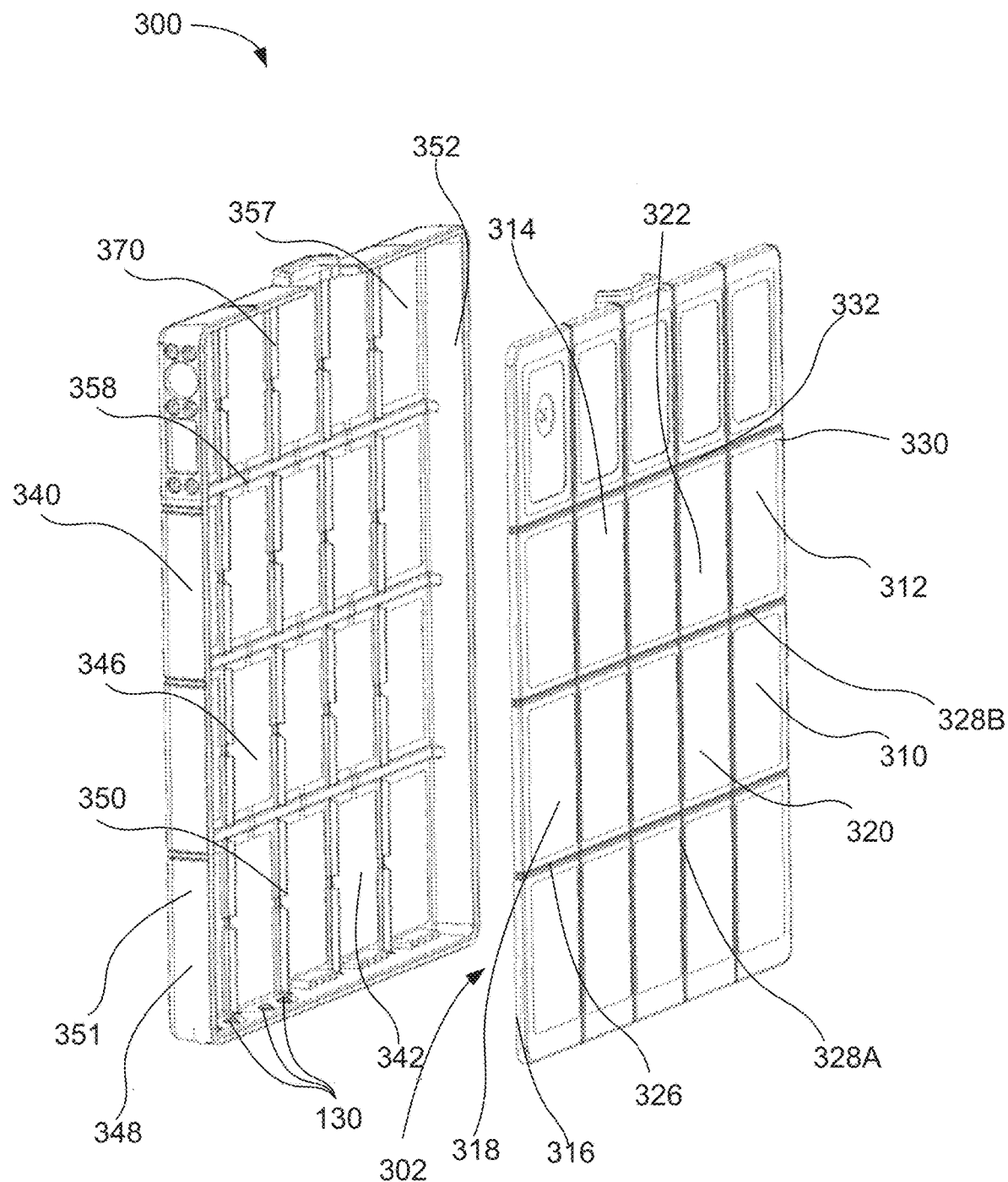
FIG. 8 illustrates an exploded front perspective view of the exemplary housing of FIG. 7 according to aspects described herein.

FIG. 6 illustrates a flowchart of exemplary assembly steps performed to encase the contact component 130 into the CWB housing 100 using an injection molding process.

In operation 505, contact components (e.g., compact components 130) may be positioned in a mold for forming the lower housing of the CWB housing (e.g., lower housing 205). The contact components 130 may be seated in a portion of the mold that forms an outer wall of the lower housing 205. The mold may be arranged to keep the contact components 130 from moving during the molding process.

In operation 510, an injection molding process may be performed to form the lower housing 205 of the CWB housing with the contact components embedded within the edge or side of the lower housing of the CWB housing. A polymeric material may be injected into the mold and flow through the mold to form the lower housing 205. The material may flow around the edges of the contact components 130 that are positioned in the mold. For example, the material may flow around and/or through the crossed lines or cross-hatching of the knurled regions and into the groove regions between the knurled regions of the contact components 130 to form a seal between the lower housing 205 of the molded CWB housing and the contact components 130. As the material solidifies, the material may form a strong, robust, and reliable seal with the contact components 130. The lower housing 205 may be molded to encase the curved walls of the contact components 130 that comprise the knurled regions 135 and the one or more groove regions 140 while exposing opposite ends of the contact components 130 to the interior and the exterior of the lower housing 205.

The knurled regions 135 and one or more groove regions 140 may improve the seal between the contact components 130 and the lower housing 205 by forming a mechanical lock to secure the contact components 130 within the lower housing 205. The mechanical lock may be formed by the variations in radius of the contact components 130 through the knurled regions 135 and the one or more groove regions 140. The knurled regions 135 and one or more groove regions 140 may improve a seal between the contact components 130 and the lower housing 205 compared to traditional contact components that do not include the features of the knurled regions and one or more groove regions. A path length along a surface of the contact component 130 including the knurled regions 135 and one or more groove regions 140 from an end facing the interior of the lower housing 205 to an end facing the exterior of the lower housing 205 may be longer than a corresponding path length in the traditional contact component that does not include the features of the knurled regions and one or more groove regions. The variations in radius of the contact components 130 through the knurled regions 135 and the one or more groove regions 140 may increase the path length along the surface of the contact component 130 including the knurled regions 135 and one or more groove regions 140 compared to traditional contact components that do not include the features of the knurled regions and one or more groove regions. The increased path length may also increase a surface area of the contact component 130 that contacts and forms a seal with the wall of the lower housing 205 in which the contact component 130 is embedded, and this surface area may be greater than a corresponding surface area of the traditional contact component, that does not include the features of the knurled regions and one or more groove regions, adjacent to a wall of a housing. The increase surface area may improve adhesion between the mold material that directly contacts the contact components 130 compared to an alternative similarly sized traditional contact component lacking the knurled regions and one or more groove regions. Flowing the material around and through the knurled regions 135 and the one or more groove regions 140 during the injection molding process of the lower housing 205 may form a stronger, more reliable, and tighter bond between the material of the housing 205 and the contact components 130 than using glue, adhesive, or reflowing a liquid material between alternative similarly-sized contact components and a previously molded housing.

In operation 515, the molded lower housing 205 of the CWB housing having the embedded contact components 130 may be inspected. The inspection may include visual inspection, machine vision, and/or image processing to identify any voids, cracks, or regions of the molded lower housing 205 that do not meet minimum thickness requirements. The inspection may be performed using light in a visual spectrum region, infrared spectrum region, or other spectrum region.

In operation 520, a determination may be made regarding whether the molded lower housing of the CWB housing passes specified quality standards. If the inspection does not pass the specified quality standards, the failed molded lower housing 205 of the CWB housing with embedded contact components may be discarded in operation 525. The parts of the failed molded lower housing 205 of the CWB housing with embedded contact components 130 may be recycled. Following the discard and/or recycling of operation 525, the method may return to operation 505 to begin again with another set of materials. If the inspection does pass the specified quality standards in operation 520, the method may proceed to operation 530.

In operation 530, interior components 20 of the CWB 10, for example, one or more battery cell elements, PCBAs, wires, electronic circuits, and electrically conductive fasteners 105 that mate with the contact components 130, may be assembled and installed in the dried and solidified lower housing 205 of the molded CWB housing. The interior components 20 of the CWB 10 may be seated against and/or attached to the interior wall(s) of the molded CWB housing. The interior components 20 of the CWB 10 may be electrically coupled with the contact components 130 via the electrically conductive fasteners 105 being mated with corresponding holes of the contact components 130 accessible from the interior of the lower housing 205. The interior components 20 of the CWB may be tested for functionality before or when being installed, and any problems discovered by testing the interior components 20 may be identified and corrected before advancing to the next assembly operation.

In operation 535, a mold for an upper housing of the CWB housing, for example, a mold for forming an upper housing that mates with lower housing 205, may be used to form the upper housing by an injection molding process. A polymeric material may be injected into the mold for the upper housing of the CWB housing and flow through the mold while being molded into a shape of the upper housing of the CWB housing.

In operation 540, the molded upper housing may be disposed adjacent to the molded lower housing 205 of the CWB housing having the contact components encased therein. The upper housing and the lower housing may be attached, glued, welded, or laser welded together to secure and form a seal between the upper housing and the lower housing to seal the interior of the CWB housing. The attachment process may form a strong, robust, and reliable seal between the upper housing and the lower housing of the CWB housing.

In operation 545, the molded lower housing 205 having the embedded contact components 130 may be inspected. The inspection may include both the upper housing and the previously inspected lower housing 205 of the molded CWB housing, including seams between the upper and lower housings. The inspection may include visual inspection, machine vision, and/or image processing to identify any voids, cracks, or regions of the molded CWB housing that do not meet minimum thickness requirements. The inspection may be performed using light in a visual spectrum region, infrared spectrum region, or other spectrum region. The inspection may include immersion tests according to a standard, for example, the IP Code, to detect whether any solids and/or liquids are able to enter the interior of the CWB housing within test conditions.

In operation 550, a determination may be made regarding whether the molded CWB housing passes specified quality standards. If the inspection does not pass the specified quality standards, the failed molded CWB housing with embedded contact components may be discarded in operation 555. The parts of the failed molded CWB housing with embedded contact components may be recycled. Following the discard and/or recycling of operation 555, the method may return to operation 505 to begin again with another set of materials. If the inspection does pass the specified quality standards in operation 550, the method may end with a completed molded CWB housing.

While aspects of the disclosure have been described with reference to battery cells and/or a CWB comprising battery cells, arrangements and methods as described herein may also be applied to other devices and systems having one or more objects or inserts that communicate between an interior region and an exterior region of a housing. For example, the arrangements and methods described herein may apply to any electronic device disposed within a housing for which protection against immersion in liquids and/or intrusion of solids or fluids is desired. Example electronic devices may include underwater cameras, sonar devices, radar devices, lidar devices, emergency radio beacons, satellite communications devices, terrestrial wireless communications devices, global positioning system (GPS) receivers, electronic environmental sensor devices, electronic medical devices, solar cell based power generation devices, wave motion based power generation devices, fuel cell based power generation devices, and/or portable chemical batteries for powering electronic or electrical devices.

Turning now to another exemplary housing 300 for the exemplary conformal wearable battery (CWB) 10 shown in FIG. 1. Housing 300 may have similar properties as housing 100, 200 described above with respect to the contact components 130 being insert molded to one of the shells of housing 300 to seal around the contact component 130. The CWB 10 may bend or move in both a horizontal and/or vertical direction, or move in some combination thereof to meet the requirements of MIL-PRF-32383/4A. For instance, CWB 10 may be required to flex at least 800 times under load to a 7 inch radius curved surface, such that an edge of the CWB may be capable of deflecting, in each direction, at least a specified distance (i.e., 1 inch) from a centerline of the CWB without sustaining physical or electrical damage. Accordingly, housing 300 may be able to withstand repeated bending or flexing cycles to allow the CWB to meet the requirements of MIL-PRF-32383/4A The housing 300 may include an upper housing or upper shell 310 and a lower housing or lower shell 340 that connect to each other to form an interior cavity 302 to receive the battery cells 20 and other electronics of the conformal wearable battery 10. Once the plurality of battery cells 20 and other required components are installed inside the interior cavity 302, the upper shell 310 and the lower shell 340 may be attached to each other with the perimeter edges being sealed together to enable the CWB 10 to meet the environmental requirements of MIL-PRF-32383/4A.

To meet these requirements, each shell 310, 340 may be constructed such that each shell 310, 340 may bend and flex. In addition to allowing the CWB 10 to bend and flex, the housing 300 may also protect the internal battery cells 20 and other components to keep the CWB 10 working properly. In some examples, each shell 310, 340 may be constructed to include rigid regions to strengthen localized area of each shell 310, 340 while having some areas that are more flexible to allow housing 300 to bend and move. In particular, the upper shell 310 may be formed from multiple materials and may include a first member 318 formed from a first material and a second member 326 that is formed from a second material, and the lower shell 340 may be similarly formed to include a first member 342 formed from a first material and a second member 350 that is formed from a second material. In both of the shells 310, 340, the first material may have a higher stiffness or hardness (i.e. durometer) than the second material. For example, the first material may have a durometer of approximately 50 Shore D or greater, or within a range of 40 Shore D and 70 Shore D, or in some cases within a range of 30 Shore D and 80 Shore D, while the while the second material may have a durometer of approximately may have a durometer of approximately 70 Shore A, or within a range of 55 and 90 Shore A. Accordingly, the second member 326, 350 of each shell 310, 340 may bend easier or be more flexible than its corresponding first member 318, 342. In addition, as discussed above, the contact component 130 may be molded into one of the shells 310, 340 in either its corresponding members when the shell is formed. For instance, as illustrated in FIG. 1, the contact component 130 may be molded with the first member 342 in the perimeter walls 348 of the lower shell 340.

In the illustrated examples of FIGS. 1 and 7-13, the upper shell 310 may include a front wall 312 that forms an exterior or front outward facing surface 314 of the housing 300 and an interior surface 315 opposite the outward facing surface 314. The outward facing surface 314 may be formed from outward facing surfaces 322 of a plurality of rigid regions 320 of the first member 318 and an outward facing surface 330 of the second member 326. A perimeter surface 316 may extend from a perimeter of the outward facing surface 314 towards the interior surface 315. The first member 318 may have a plurality of rigid regions 320 that are spaced apart from each other, where the plurality of rigid regions 320 may be arranged in an array with the plurality of rigid regions 320 in both a horizontal direction and a vertical direction. For example, in the illustrated example of FIG. 7, the rigid regions 320 are arranged in an array of five columns of rigid regions 320 arranged in a horizontal direction and four rows of rigid regions 320 arranged in a vertical direction. The arrangement of the rigid regions 320 may have fewer than four rows and five columns or may have greater than four rows and five columns depending upon the desired battery output requirements. The second member 326 may be located between each of the rigid regions 320, such that the second member 326 forms a grid-like structure with vertical regions 328A and horizontal regions 328B that are arranged in the spaces between the neighboring rigid regions 320. The vertical flexible regions 328A may have a width between neighboring rigid regions 320 when measured along the outward facing surface 314 on the front wall 312 that is the approximately 10 percent of the width of each rigid region 320, or within a range of 7 percent and 15 percent of the width of each rigid region 320. Additionally, the horizontal flexible regions 328B may have a height between neighboring rigid regions that is approximately 14 percent of the height of each rigid region 320, or within a range of 10 percent and 20 percent of the height of each rigid region 320.

As discussed above, the second member 326 may form flexible regions within the front wall 312 of the upper shell 310 that promotes bending within these regions while allowing the rigid regions 320 to remain substantially planar when the housing 300 is in a deformed state. In addition, the thickness of the second member 326 may be substantially the same thickness as the rigid regions 320 such that when the housing 300 is in an undeformed or unstressed state the outward facing surface 330 of the second member 326 may be substantially coplanar with the outward facing surface 322 of the rigid regions 320. In order to further promote bending within the vertical regions 328A or horizontal regions 328B of the second member 326, a plurality of grooves 332 may be located within the outward facing surface 330 of the second member 326. In some examples, the grooves 332 may only be located in the outward facing surface 314, or in other examples, the grooves 332 may be located in both the outward facing surface 314 and the inward facing surface 315. The grooves 332 in the horizontal regions 328B may have a width that is greater than a width of the grooves 332 in the vertical regions 328A. For example, the width of the grooves 332 in the horizontal regions 328B may be 1.2 to 1.5 times greater than the width of the grooves 332 in the vertical regions 328A. In addition, the grooves 332 in both the horizontal and vertical regions 328A, 328B may have the same depth, such that the grooves 332 may have a constant depth. The width of the grooves 332 may be greater than a depth of the grooves 332. For example, the depth of the grooves 332 may be that is within a range of 50 percent and 85 percent of the overall width of the groove 332 to help promote flexing in the proper locations. In some examples, the depth of the grooves may be within a range of 2 mm and 4 mm. Alternatively, such as in the housing 300 shown in FIG. 15, the flexible member 326 may not include grooves.

Figure 9:
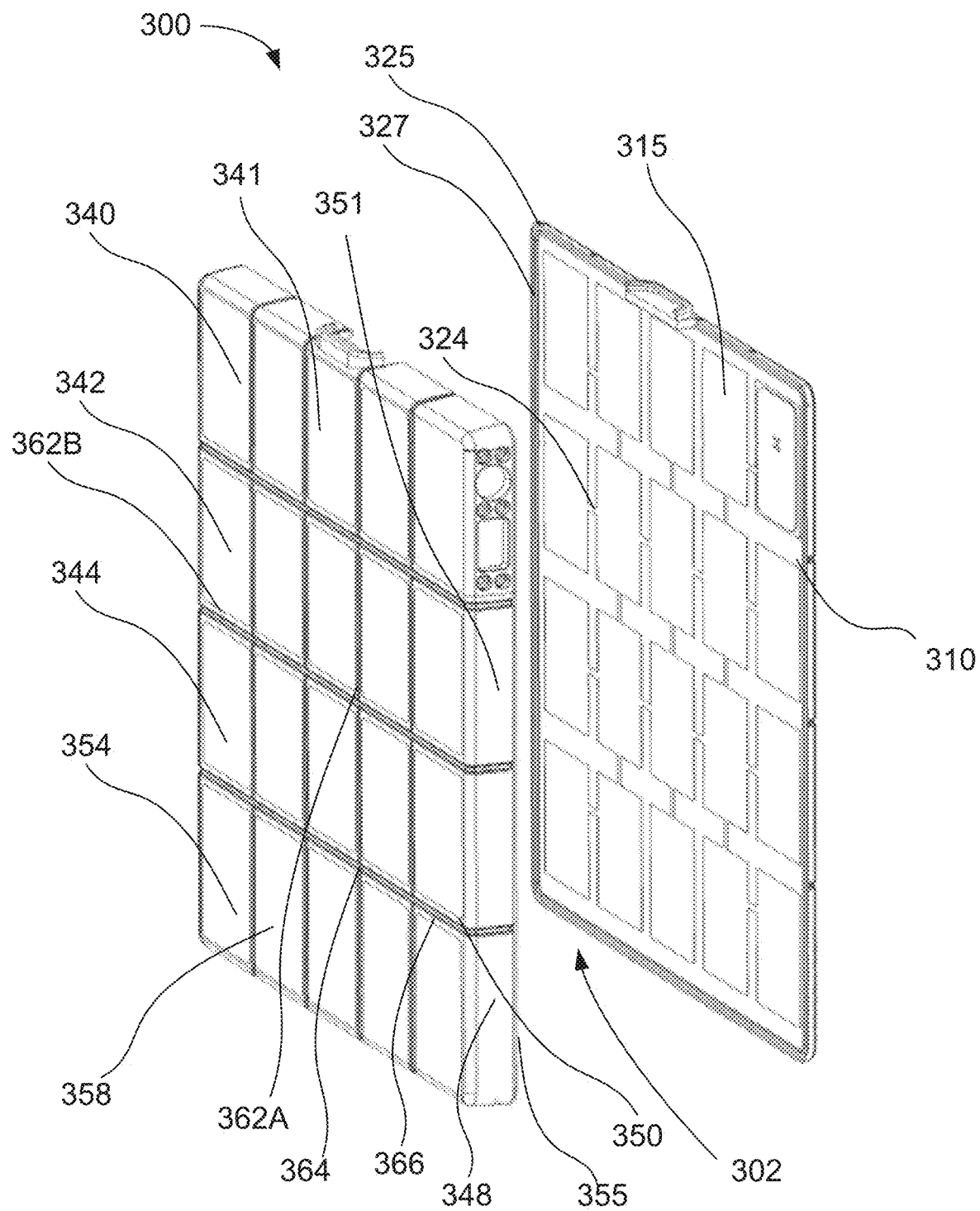
FIG. 9 illustrates an exploded rear perspective view of the exemplary housing of FIG. 7 according to aspects described herein.
Figure 10:
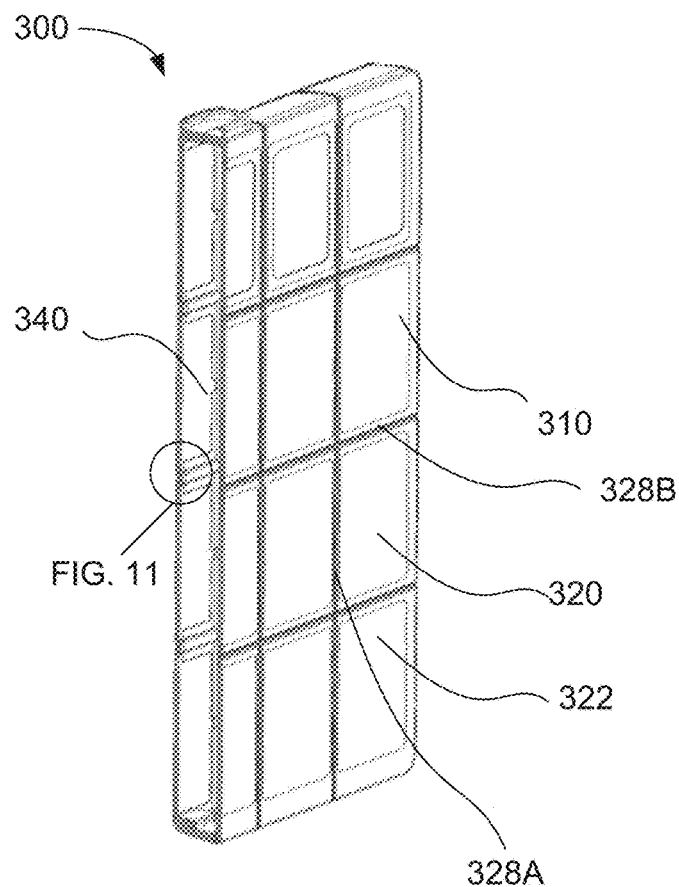
FIG. 10 illustrates a cross-sectional perspective view of the exemplary housing of FIG. 7 along line 10-10 according to aspects described herein.
Figure 13:
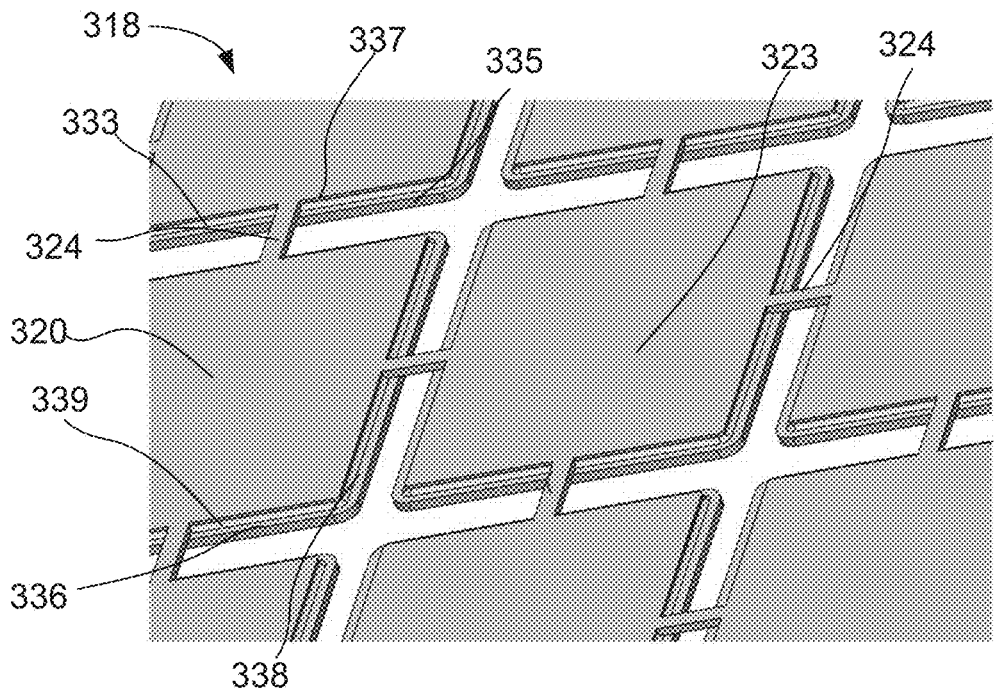
FIG. 13 illustrates a partial perspective view of a first member of one of the shells of the exemplary housing of FIG. 7 according to aspects described herein.

Each of the rigid regions 320 may be sized to correspond to the size of each of the battery cells. For instance, a length and/or a width of each rigid regions 320 may be within a range of 0.95 and 1.05 of a corresponding length and/or width of a corresponding battery cell. In other examples, the length of width of each rigid region 320 may be within a range of 0.90 and 1.10 of the corresponding length and/or width of the corresponding battery cell. In addition, each rigid region 320 may be substantially aligned (where the center of the rigid region 320 and the center of the battery cell are substantially coaxial with each other) with the corresponding battery cell located behind it. Each rigid region 320 may be connected to an adjacent rigid region 320 by a channel 324. The channel 324 may help to form a living hinge between the rigid regions 320 and may have a thickness that is less than the thickness of the rigid region 320. As illustrated in FIGS. 9 and 13, the channels 324 may connect to neighboring rigid regions 320. The channels 324 may also assist in manufacturing by providing a pathway for material to flow from one rigid region 320 to a neighboring rigid region 320 when the first member 318 is formed using a molding process. The channels 324 may be visible along the inward facing surface 315 of the front wall 312.

Additionally, the second member 326 may form the outer perimeter surfaces 316 along with the outer surfaces of the front wall 312 to provide some flexibility along the outer edges of the upper shell 310. The interior perimeter edges 325 of the upper shell 310 may include a receiver 327 or other feature to mate with a corresponding engaging member 355 on the lower shell 340. The engaging member 355 may engage the receiver 327 on the upper shell to help provide a mechanical connection to assist with securing the upper shell 310 to the lower shell 340.

Figure 15:
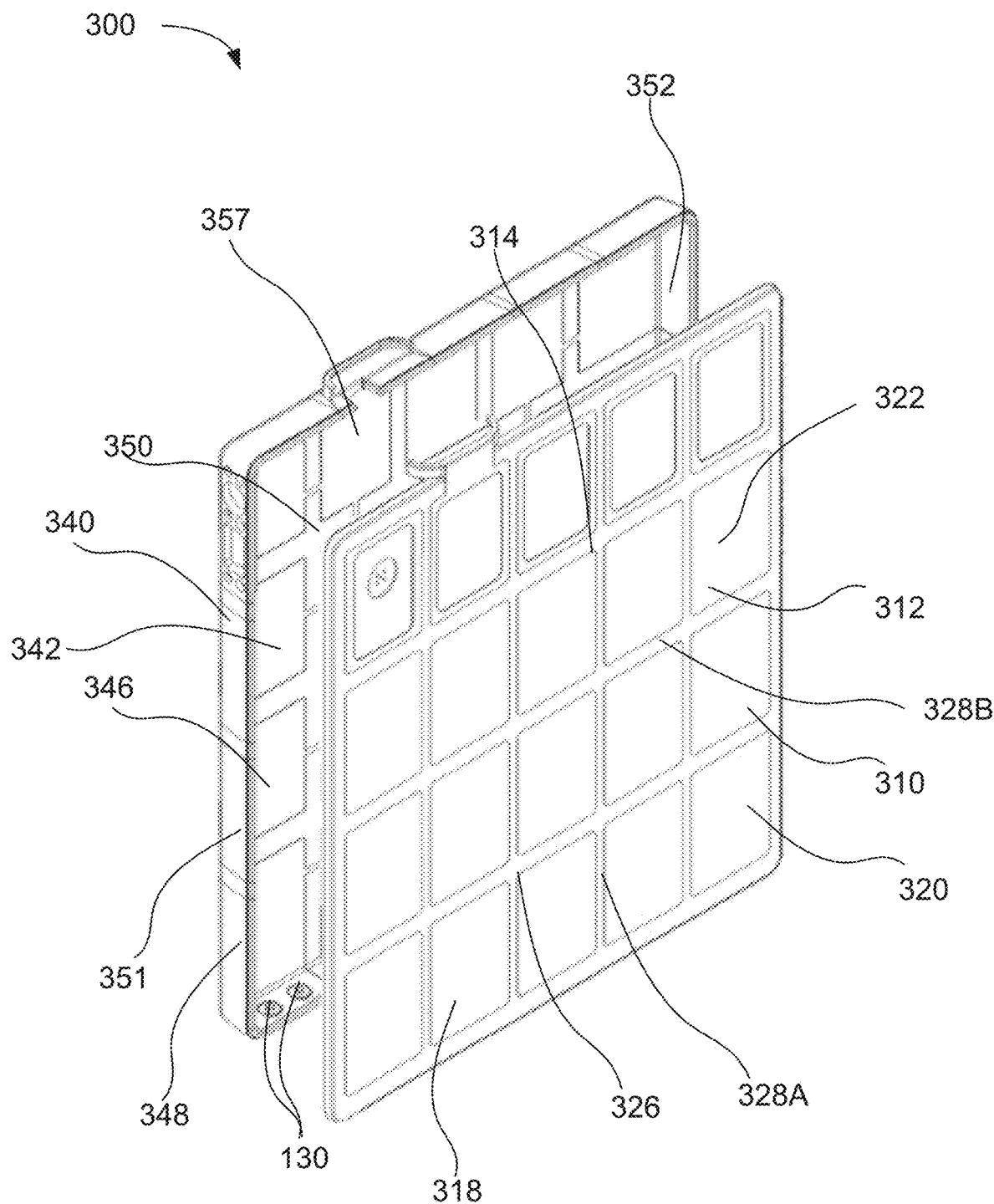
FIG. 15 illustrates an exploded perspective view of another exemplary housing of the CWB of FIG. 1 according to aspects described herein.
Figure 16:
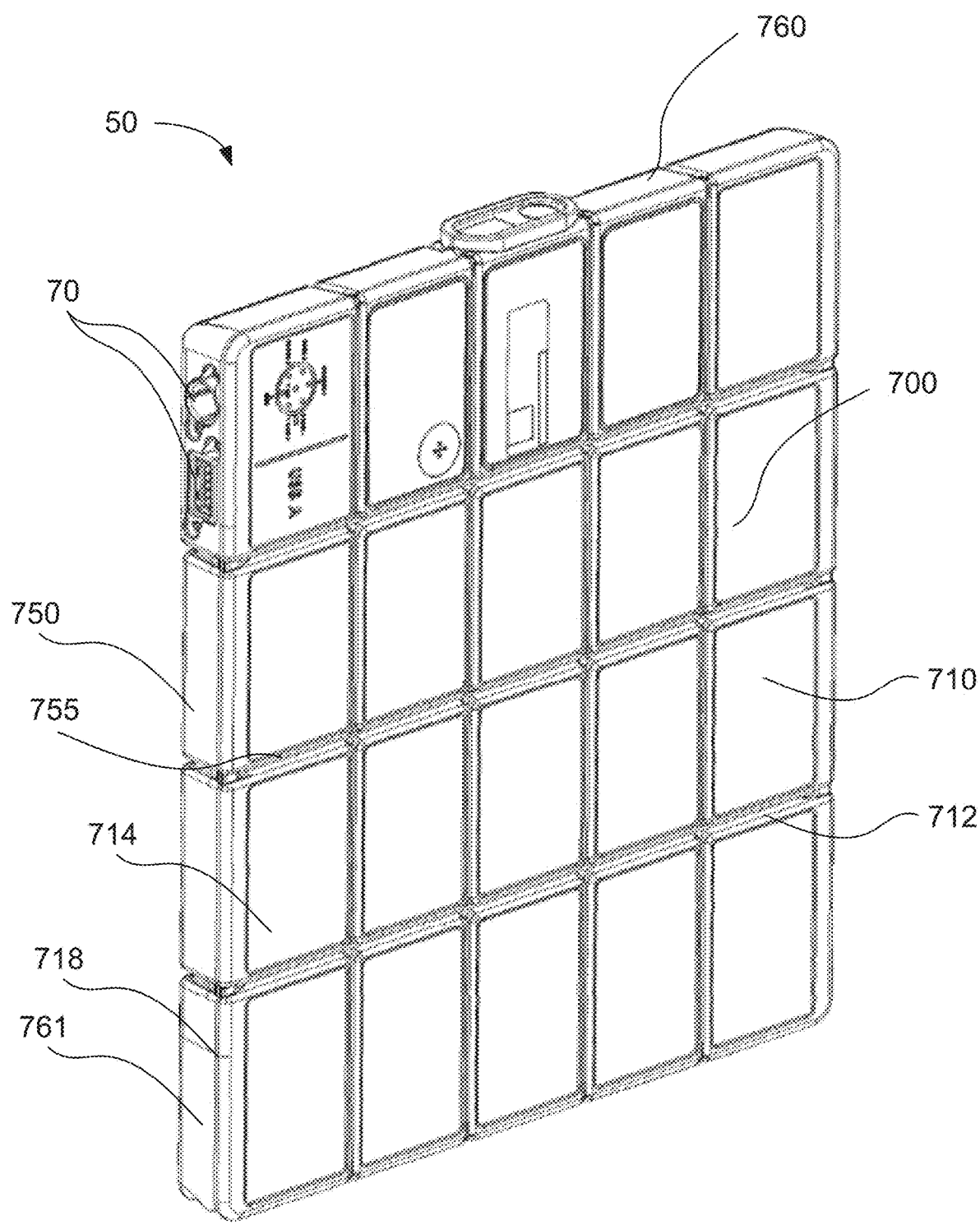
FIG. 16 illustrates a front top perspective view of another exemplary conformal wearable battery (CWB) according to aspects described herein.
Figure 17:
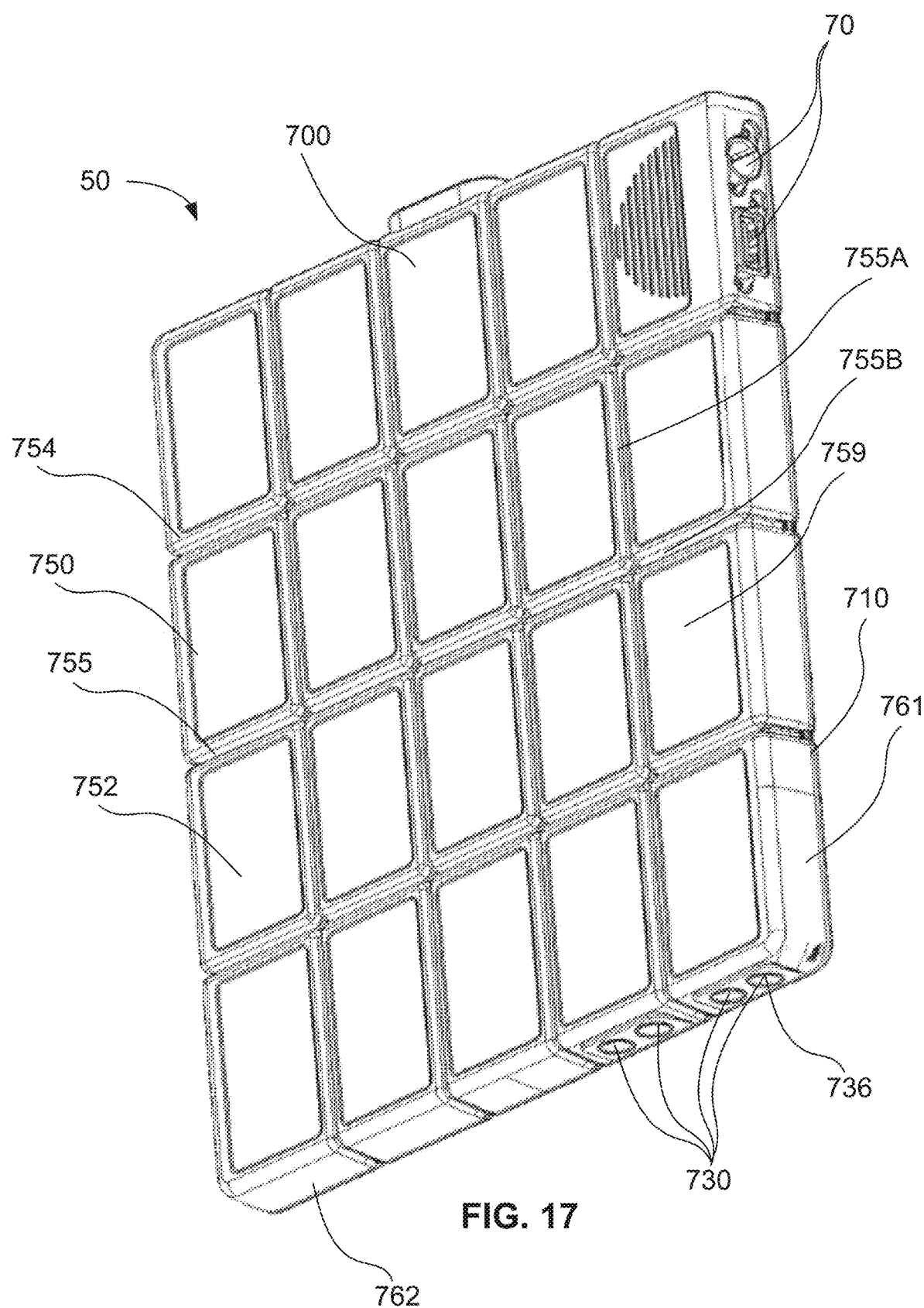
FIG. 17 illustrates a rear bottom perspective view of the conformal wearable battery of FIG. 16 according to aspects described herein.

As discussed above, the lower shell 340 may connect to the upper shell 310 to form the interior cavity 302 that receives the battery cells and other electronics. The lower shell 340 may include a rear wall 341 that forms an exterior or rear outward facing surface 344 of the housing 300 and an interior surface 346 opposite the exterior surface 344. The lower shell 340 may also include a perimeter wall 348 that extends away from the exterior surface 344 forming exterior side surfaces 351 and interior side surfaces 352. The lower shell 340 may be similarly constructed as the upper shell 310 with a first member 342 and a second member 350. The first member 342 may include a plurality of rigid regions 354, where the plurality of rigid regions 354 may be arranged in an array with the plurality of rigid regions 354 in both a horizontal direction and a vertical direction similar to the array of the upper shell 310. Each of the rigid regions 354 may be sized to correspond to the size of each of the battery cells. The length and width of the rigid regions 354 may be similarly sized with the rigid regions 320 of the upper shell 310. Similar to the upper shell 310 each rigid region 354 may be connected to an adjacent rigid region 354 by a channel 358. The second member 350 may be located between each of the rigid regions 354, such that the second member 350 forms a grid-like structure with vertical regions 362A and horizontal regions 362B that are arranged in the spaces between the array of rigid regions 354. The flexible regions 362A, 362B of the second member 350 may promotes bending within these regions while allowing the rigid regions 354 to remain substantially planar when the housing 300 is in a deformed state. The length and width of the flexible regions 362A, 362B may be similarly sized with the flexible regions 328A, 328B of the upper shell 310. In order to further promote bending within the vertical regions 362A or horizontal regions 362B of the second member 350, a plurality of grooves 364 may be located within the outward facing surface 366 of the second member 350. In some examples, the grooves 364 may only be located in the outward facing surface 366 or in other examples, the grooves 364 may be located in one of or both the outward facing surface 366 and the inward facing surface 368 of the second member 350. The grooves 364 may be sized similarly to the grooves 332 of the upper shell 310 as described above, or may have a different size than grooves 332. Optionally, in some examples, a plurality of ribs 370 may extend from the inward facing surface 368 of lower shell 340 along the vertical regions 362A. These ribs 370 may be intermittent and run substantially along a vertical length of each rigid region 354 while being absent across the horizontal regions 362B of the second member 350. In addition, as shown in the illustrated example of FIG. 11, the channels 358 may extend from a first rigid region 354A to an adjacent rigid region 354B and the channels 358 may extend inward may not be planar with the adjacent rigid regions 354A, 354B where an inward facing surface 360 of the channel 358 that connects from the first rigid region 354A to the second rigid region 354B may be further inward than the inward facing surface 357 of each of the rigid regions 354A, 354B. Alternatively, as shown in FIGS. 13 and 15, the channels 324, 358 may be planar with the inward facing surfaces 323, 357 of the corresponding rigid region 320, 354.

Both the upper shell 310 and the lower shell 340 may be formed in a similar manner. For example, each shell 310, 340 may be formed using an injection molding process, in particular, each shell 310 may be formed using a two-shot molding or overmolding technique. Using this process, the first members 318, 342 of each shell 310, 340 may be formed using an injection molding technique by filling a first mold with the first material, thereby forming the first member as a single unitary member. The first members 318, 342 may then be removed from the first mold and placed into a second mold. A second material may then be injected into the second mold where the second material flows over the first member 318, 342 whereby the second member 326, 350 is formed onto its respective first member 318, 342 also using an injection molding process. For example, second member 326 is formed onto the first member 318 to form the upper shell 310, and second member 350 is formed onto first member 342 to form the lower shell 340. In some examples, the first mold may have additional slides or components that can be arranged such that the second member 326, 350 may be formed onto its corresponding first member 318, 342 without removing the first member 318, 342 from the first mold and placing it into a second mold. Alternatively, the second members 326, 350 may be molded separately from their corresponding first members 318, 342 and joined using adhesives, welding, or other methods for attachment. Optionally, the first members 318, 342 and second members 326, 350 may be stamped, machined, or formed using other production methods.

Figure 11:
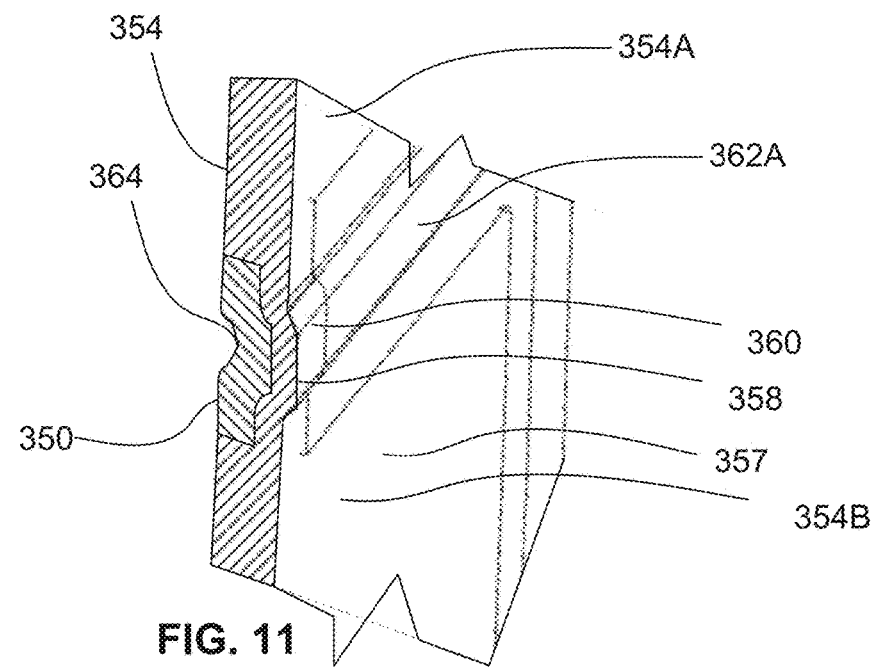
FIG. 11 illustrates an enlarged view of FIG. 10 according to aspects described herein.
Figure 12:
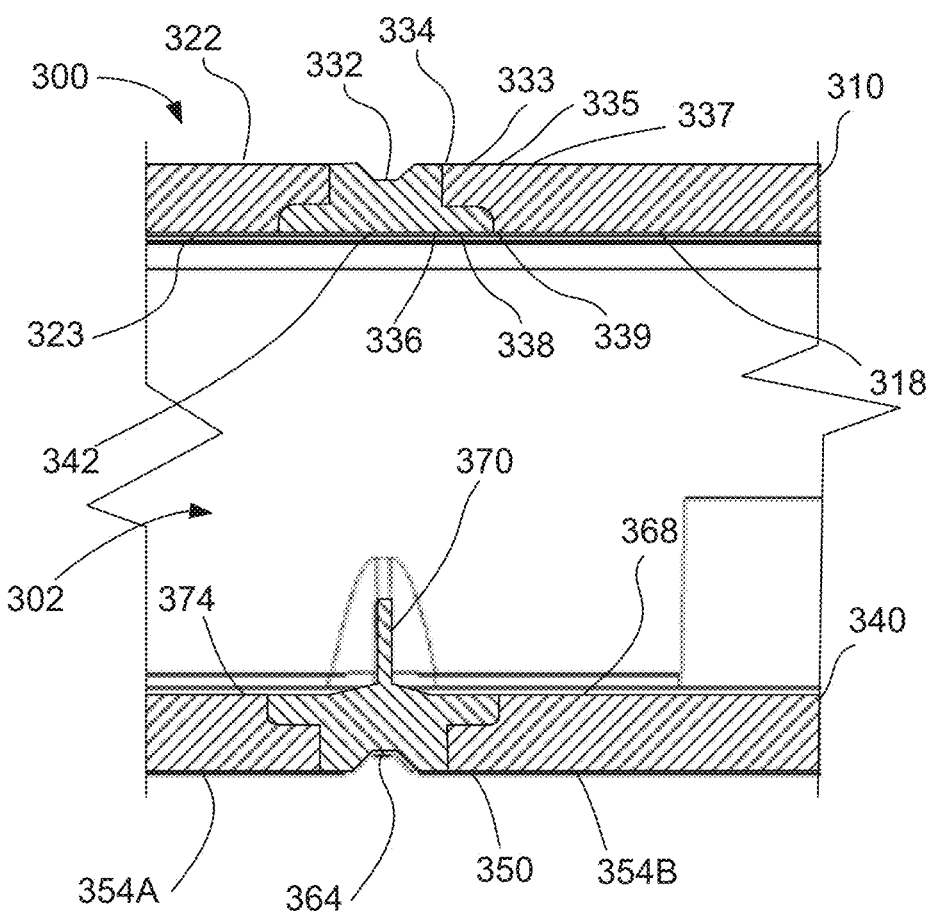
FIG. 12 illustrates a partial cross-sectional view of the exemplary housing of FIG. 7 along line 12-12 according to aspects described herein.

The interface between the first member 318, 342 and its corresponding second member 326, 350 may be arranged to help secure the members together and to handle the stresses created in this joint to prevent any separation between the two members during repeated bending cycles. As shown in FIGS. 11 and 12, each rigid region 320 may have an edge region 333 along the perimeter of that extends between the outward facing surface 322 and the inward facing surface 323 along a perimeter of each rigid region 320. This edge region 333 may extend completely around the perimeter of each rigid region 320 except for the areas where the channel 324 of each rigid region 320 may extend to a neighboring rigid region 320. The edge region 333 may include a first edge surface 335 and a second edge surface 337, where the first edge surface 335 and the second edge surface 337 may extend in different directions. The first edge surface 335 may extend substantially perpendicular from the outward facing surface 322 an end 336 approximately 50 percent of a thickness of the rigid region 320. The second edge surface 337 may have a first portion 338 that extends from end 336 in a direction that is substantially perpendicular to the first edge surface 335. The second edge surface 337 may also have a curved portion 339 that connects from the first portion 338 to the inward facing surface 323. The second member 326 may have a second edge region 334 that has a complementary structure to the first edge region 333 such that the first member 318 and the second member 326 may be substantially coplanar on adjacent surfaces of the first edge region 333. This edge region 333 may allow the second member 326 to have a width adjacent the inward facing surfaces 323 of the rigid regions 320 that is greater than a width of the second member 326 adjacent the outward facing surfaces 322 of the rigid regions 320. In some examples, the distance across the horizontal flexible regions 328B may be greater than the distance across the vertical flexible regions 328A. Because the width of the horizontal flexible regions 328B may be greater than the width of the vertical flexible regions 328A, the ratio of the width of the second member 326 at the horizontal flexible regions 328B adjacent the inward facing surfaces 323 of the rigid regions 320 may be within a range of 125 percent and 160 percent of the width of the second member 326 adjacent the outward facing surfaces 322 of the rigid regions 320, while the ratio of the width of the second member 326 at the vertical flexible regions 328A adjacent the inward facing surfaces 323 of the rigid regions 320 may be within a range of 170 percent and 200 percent of the width of the second member 326 adjacent the outward facing surfaces 322 of the rigid regions 320. While the above description uses only the reference numbers and features of the upper shell 310, the edge region 374 of the rigid regions 354 may have similar if not identical surfaces such that the second member 350 of the lower shell 340 may have similar dimensions and dimensional relationships as the second member 326.

Figure 14:
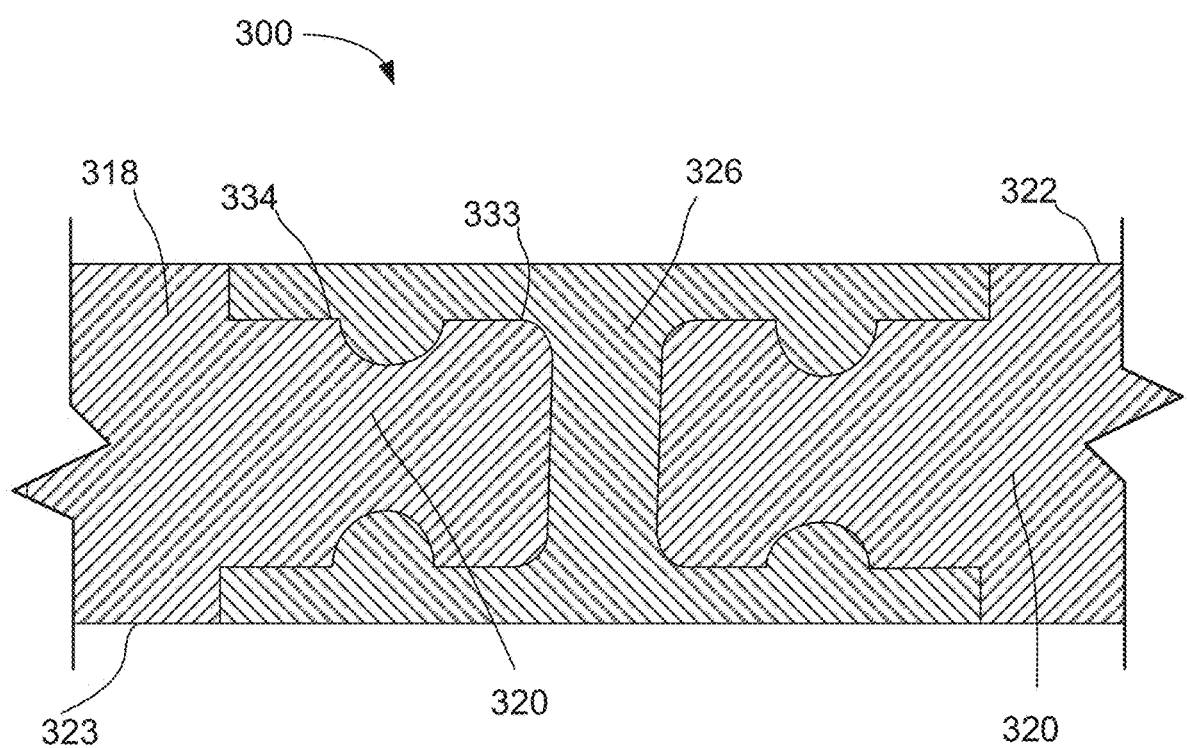
FIG. 14 illustrates a cross-sectional view of an alternate example of a joint between a first member and a second member of one of the shells of the exemplary housing of FIG. 7 according to aspects described herein.

Alternatively, the interface between rigid member 318 and the flexible members 326 may have different edge geometry along the rigid regions 320 to promote a robust and durable joint. For instance, as shown in FIG. 14 where the edge region 333 may have a sinusoidal or curved surface on both the outward facing surface 322 and the inward facing surface 323, such that the flexible member 326 has a corresponding sinusoidal or curved surface shape, then the flexible member 326 may be formed onto each of the rigid regions. As another option, the rigid region 320 may also include an opening, such as a hole, that extends either partially or completely through the thickness of the rigid region that receives the material of the flexible member to help in forming a secure joint between the flexible member 326 and the rigid member 318.

As discussed above, the shells 310, 340 utilize rigid members 318, 342 and flexible members 326, 350 to form a bendable housing 300. The rigid members 318, 342 may be formed by a molding technique such as injection molding and may be formed from a material with a greater stiffness or rigidity than a material used to form the flexible members 326, 350. For instance, the rigid members 318, 342 may be formed from a first material that may be a polymeric material such as polycarbonate (PC), polypropylene (PP), or similar materials known to one skilled in the art. The polymeric material may be a filled or unfilled polymer. The second material may be molded onto the rigid member 318, 342 that forms the flexible member 326, 350. The second material may be a thermoplastic elastomer (TPE), a thermoplastic urethane (TPU), thermoplastic vulcanizates (TPV), or other similar material. Optionally, the second material may have a deep red aniline dye colorant that appears black. This aniline dye may be an infrared transmitter that allows the upper shell 310 and the lower shell 340 to be laser welded to permanently join the shells 310, 340 together to seal the CWB 10.

FIGS. 16-28 illustrate another exemplary conformal wearable battery (CWB) 50. CWB 50 may include internal battery cells 60 and other electronic components such as a battery-charging controller, and a computing processor to allow the CWB 50 to operate properly similar to CWB 10 described above. These electronic components may be received in an interior cavity 702 of housing 700 to protect the battery cells 60. Also, similar to CWB 10 described above, CWB 50 may bend or move in both a horizontal and/or vertical direction, or bend in some combination thereof to meet the requirements of MIL-PRF-32383/4A. For instance, CWB 10 may be required to flex at least 800 times under load to a 7 inch radius curved surface, such that an edge of the CWB may be capable of deflecting, in each direction, at least a specified distance (i.e., 1 inch) from a centerline of the CWB 10 without sustaining physical or electrical damage. Accordingly, housing 700 may be flexible or bendable to be able to withstand repeated bending or flexing cycles to allow CWB 50 to meet the requirements of MIL-PRF-32383/4A. The housing 700 may include an upper housing member or upper shell 710 and a lower housing member or lower shell 750 that connect to each other to form an interior cavity 702 that receives the battery cells 20 and other electronics of the conformal wearable battery (CWB) 50. Once the plurality of battery cells 60 and other required components are installed inside the interior cavity 702, the upper shell 710 and the lower shell 750 may be joined together along their perimeters to seal the housing 700 to enable the CWB 50 to meet the environmental requirements of at least IP67 or to meet MIL-PRF-32383/4A requirements.

The upper shell 710 may have a front wall 712 with an outward facing surface 714, an inward facing surface 716 opposite the outward facing surface 714, and a perimeter surface 718 may extend from a perimeter of the outward facing surface 714 towards the inward facing surface 716. In addition, the lower shell 750 may have a rear wall 752 with an outward facing surface 754, an inward facing surface 756 opposite the outward facing surface, and a plurality of perimeter sidewalls 760, 761, 762, 763 that extend from a perimeter of the outward facing surface 754 beyond the interior surface 756, where sidewalls 760 and 762 are arranged opposite each other on a top and bottom of the housing 700 and sidewalls 761 and 763 are arranged opposite each other on a first and second side of the housing 700.

As discussed above, CWB 50 may provide power to various electrical devices by transmitting power from the battery cells 60 through a connector 70 and may be rechargeable through the connector 70 or through the contact components 730. Contact components 730 may be electrically connected with the battery cells 60 through a conductive region 62 (i.e. flexible circuits or wiring) connected to the battery cells 60 and may have similar electrical connections as discussed above regarding contact components 130, such as a conductive element 105 (i.e. a mechanical fastener) inserted into openings of the conductive regions 62 to electrically connect the battery cells 60 and the contact components 730. The CWB 50 may include a plurality of contact components 730 that each have an outward facing surface 736 accessible from outside of the CWB 50 of the housing 700 and an inward facing surface 740 that may be connected with the conductive region 62 to the battery cells 60. Each outward facing surface 736 of the plurality of contacts 730 may be substantially planer with each other, meaning each outward facing surface 736 may be within a range +/−5 degrees with the outward facing surface of the neighboring contact 730. In the illustrated example, CWB 50 includes four contact components 730, although the CWB 50 may include fewer contacts such as one, two, or three contacts, or greater than four contacts like five contacts, six contacts, or more than six contacts. Each of the contact components 730 may be secured to the lower shell 750 of housing 700 where the lower shell 750 forms a seal around each contact component 730 to prevent ingress of moisture and debris.

Figure 21:
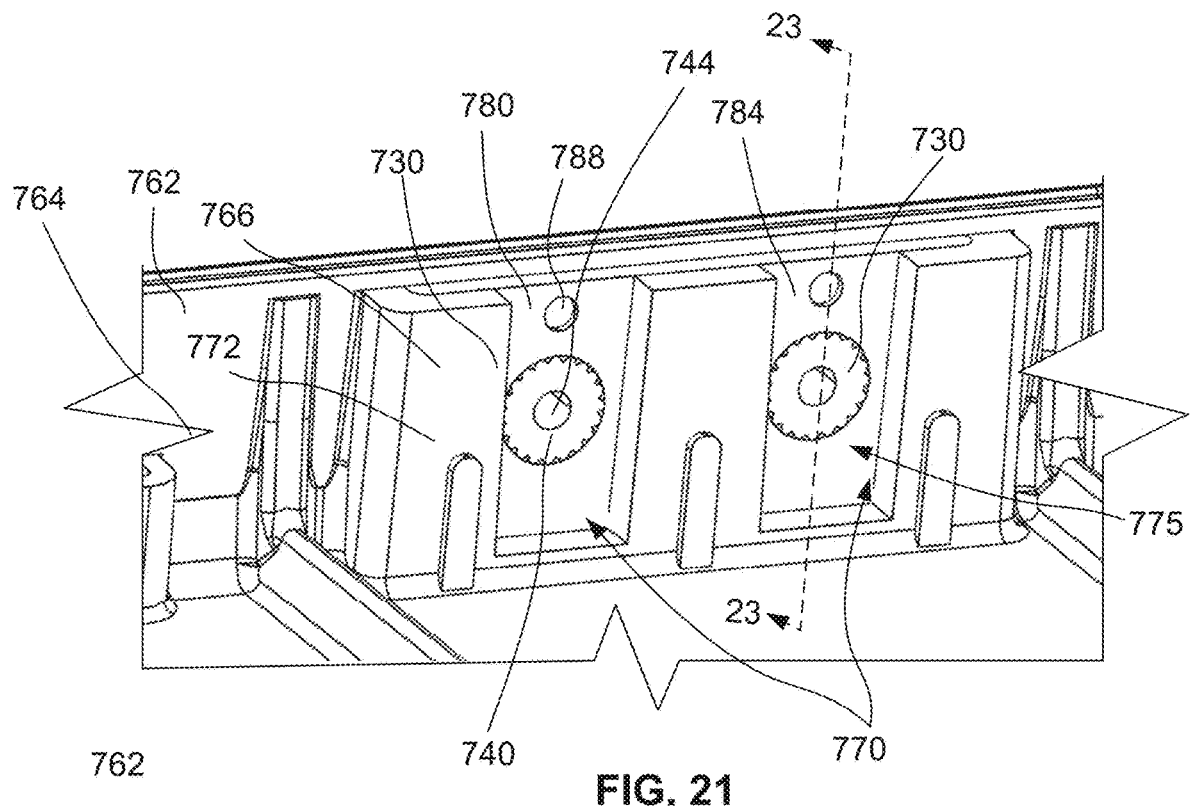
FIG. 21 illustrates an enlarged perspective view of a portion of the lower shell of FIG. 19 according to aspects described herein.
Figure 22:
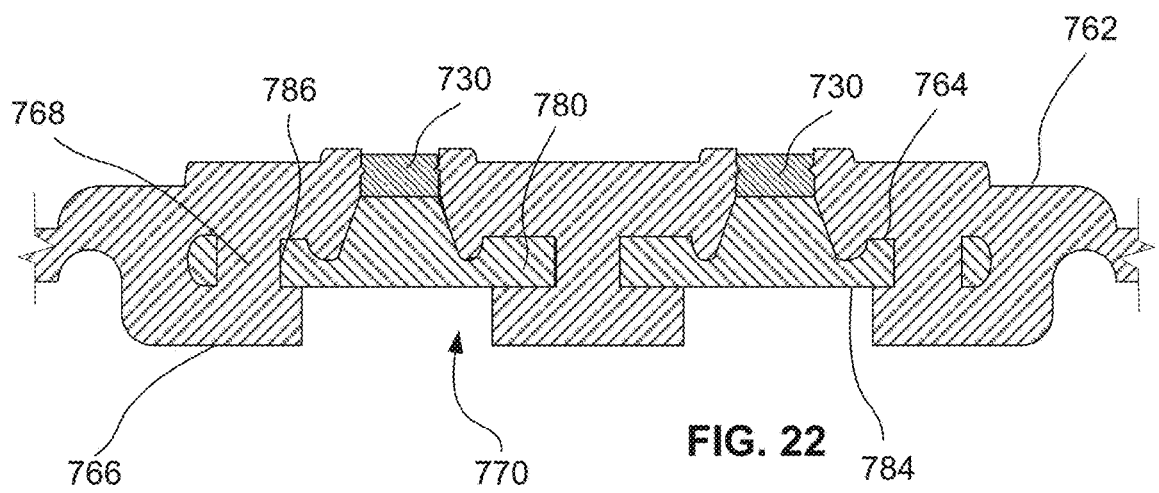
FIG. 22 illustrates a cross-sectional perspective view of a portion of the lower shell of the housing along line 22-22 of FIG. 19 according to aspects described herein.

As shown in FIGS. 18A-23, lower shell 750 of the housing 700 may include a plurality of contact carrier assemblies 775, where each contact carrier assembly 775 includes a contact carrier 780 that secures a plurality of contact components 730. In addition, the lower shell 750 may also include a connector plate 720 that is configured to receive one or more connectors 70 that are connected to the battery cells 60. As shown in the illustrated example, the lower housing 750 may include a pair contact carrier assemblies 775, where each contact carrier 780 secured two contact components 730. Further, in the illustrated example, each contact component 730 is individually connected to a plurality of conductive regions 62 that electrically connect the contact components 730 to the plurality of battery cells 60. As previously discussed, each shell 710, 750 of the housing 700 may be formed using a molding process, such as injection molding from a polymeric material that can flex and bend. The lower shell 750 may be formed around each contact carrier assembly 775 (i.e. the contact carrier 780 and its corresponding contact components 730) to secure contact carrier assembly 775 within to the lower shell 750. Each contact carrier 780 may be secured to a sidewall 762 of the lower shell 750 between a rear surface 764 of sidewall 762 and a rear flange 766 that is spaced rearward of rear surface 764. As shown in cross-sectional view of FIG. 22, a plurality of plugs 768 may extend from rear surface 764 of sidewall 762 through openings 786 of the contact carrier 780 to the rear flange 766 of the lower shell 750. By lower shell 750 being formed around the contact carrier 780, the plurality of plugs 768, rear flange 766, and the sidewall 762 may be a single unitary member. As shown in FIG. 21, each rear flange 766 may include an opening 770 that extends from a rear surface 772 of the rear flange 766 to enable access to an inward facing surface 740 of a contact component 730. Each opening 770 may have a slightly greater width than a width of the conductive regions 62 and conductive element 105 that connect to the inward facing surface 740 and also align each conductive region 62 such that it may be easily connected to its corresponding contact component 730.

The lower housing 750 may also be formed around the connector plate 720 to secure the connector plate 720 to the lower housing 750. For instance, the connector plate 720 may have a front surface 722, a rear surface 724 opposite the front surface, and a plurality of openings 726 extending through the front and rear surfaces 722, 724. The connector plate 720 may have a connector opening or plurality of connector openings 728 to receive a connector 70 from the battery cells 60. Similar to the contact carrier(s) 780, the lower shell 750 may be formed around the connector plate 720 and may be secured to a sidewall 761 of the lower shell 750 between a rear surface 765 of sidewall 761 and a rear flange 767 that is spaced rearward of rear surface 765. In addition, a plurality of plugs may extend from rear surface 765 of sidewall 761 through an opening 726 of the connector plate 720 to the rear flange 767 of the lower shell 750.

To enhance the upper and lower shells 710, 750 ability to bend, the upper and lower shells 710, 750 may include a plurality of vertically and horizontally intersecting grooves 755. The grooves 755 may be located within the front walls 712, 752 of the respective shells 710, 750. In some examples, the grooves 755 may be located in the outward facing surfaces 714, 754, and may have corresponding inward protrusions 757 that extend from inward facing surfaces 716, 756 of the respective upper and lower shells 710, 750. The grooves 755 may be arranged in the spaces that are between the individual battery cells within the array of battery cells 60. The grooves 755 may be arranged in both a vertical oriented grooves 755A and horizontal oriented grooves 755B. The horizontal grooves 755A may have a width that is greater than a width of the vertical grooves 755B. For example, the width of the horizontal grooves 755B may be 1.2 to 1.5 times greater than the width of the vertical grooves 755A. In addition, the vertical and horizontal grooves 755A, 755B may have the same depth, such that the grooves 755 may have a constant depth. The width of the grooves 755 may be greater than the depth of the grooves 755. For example, the depth of the grooves 755 may be that is within a range of 50 percent and 85 percent of the overall width of the groove 755 to help promote flexing in the proper locations. In some examples, the depth of the grooves 755 may be within a range of 2 mm and 4 mm. In addition, both of the upper and lower shells 710, 750 may also include a plurality of substantially rectangular shaped pockets 759 may be located in a grid-like pattern that substantially matches the layout of the plurality of battery cells 60.

Figure 24:
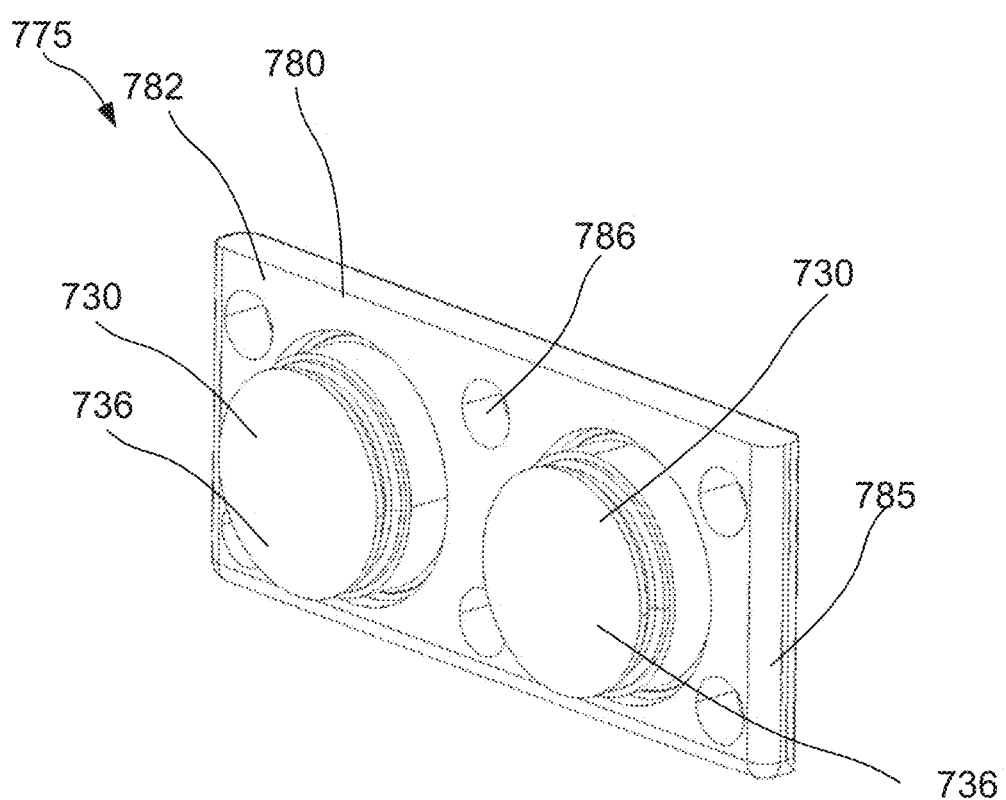
FIG. 24 illustrates a perspective view of a contact carrier assembly of the conformal wearable battery (CWB) of FIG. 16 according to aspects described herein.
Figure 25:
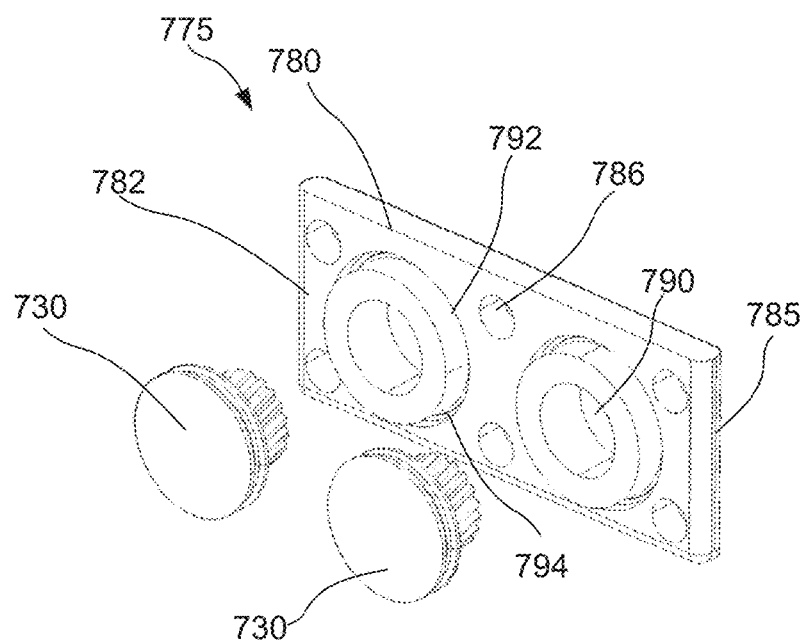
FIG. 25 illustrates an exploded perspective view of the contact carrier assembly of FIG. 24 according to aspects described herein.
Figure 26A:
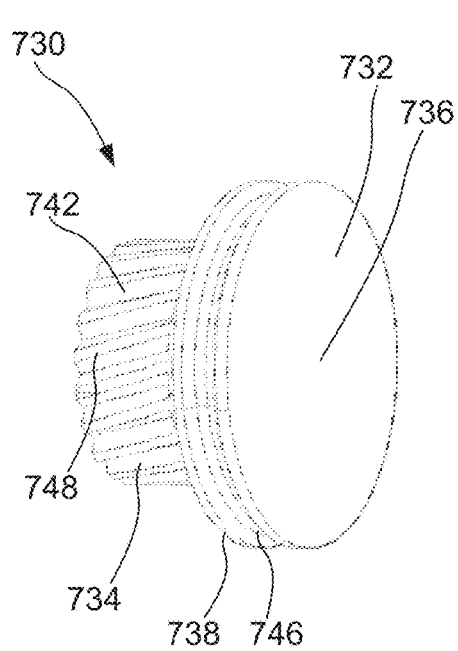
FIGS. 26A and 26B illustrate front and rear perspective views of a contact component of the contact carrier assembly of FIG. 24 according to aspects described herein.
Figure 26B:
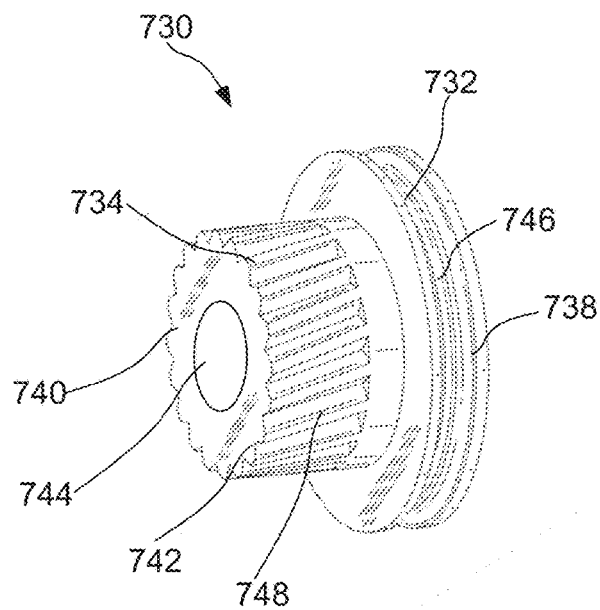
Figure 27A:
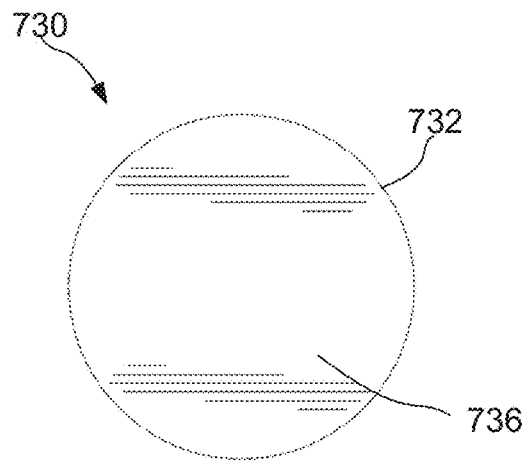
FIGS. 27A-27D illustrate front, rear, and side views of a contact component of the contact carrier assembly of FIG. 24 according to aspects described herein.
Figure 27B:
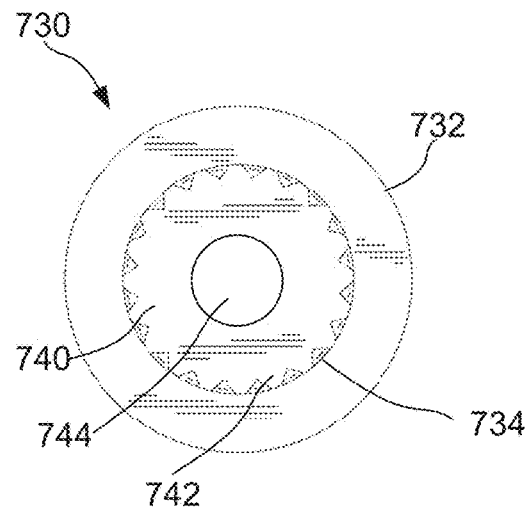
Figure 27C:
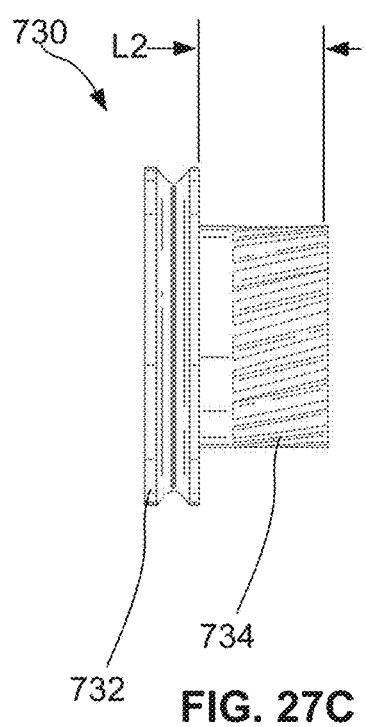
Figure 27D:
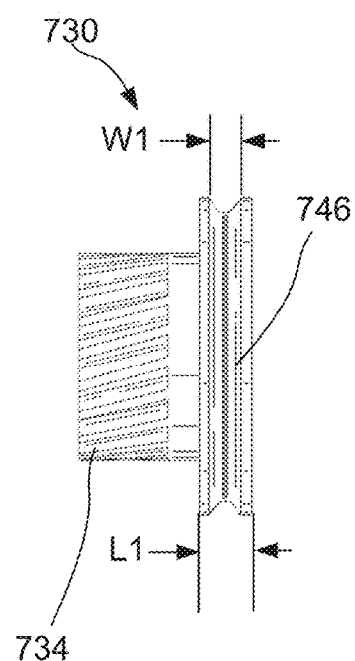

As shown in FIGS. 24-25, each contact carrier assembly 775 may include a contact carrier 780 and a pair of contact components 730. Each contact carrier assembly 775 may be formed separately from the lower shell 750 using a molding process. In some examples, the contact components 730 may be placed in a mold where the contact carrier 780 is formed at least partially around a rear portion 734 of each contact component 730 to secure the contact component 730 to the contact carrier 780. Alternatively, each contact carrier 780 may be formed separately from the contact components 730, and the contact components 730 being installed into the contact openings 790 of the carrier 780 to form the contact carrier assembly 775. For instance, the contact components 730 may be installed using an adhesive, heat staking, ultrasonic welding, or other process known to one skilled in the art. In this manner, each contact component 730 may be integrally joined to its respective contact carrier 780 to form a mechanical lock securing contact component 730 to its respective carrier 780 making these components integrally joined such that such that separation of the joined pieces cannot be accomplished without structural damage to either the carrier 780 and/or contact components 730.

Each contact carrier 780 may include features to ensure the proper alignment of the contact components 730 and to secure the carrier 780 to the lower shell 750. For instance, each contact carrier 780 may have a front surface 782, a rear surface 784 opposite the front surface 782, a sidewall surface 785 extending between the front surface 782 and the rear surface 784, and a plurality of openings 786, at least one contact opening 790, a plurality of alignment apertures 788 on the rear surface 784 above the contact openings 790, an engaging member 792 extending from the front surface 782, and a recess 794 extending around the engaging member 792 below the front surface 782. The engaging member 792 may have a tapered outer surface such that when the lower shell 750 is formed around the engaging member 792, a corresponding tapered surface 774 is formed in the lower shell 750. This pair of tapered surfaces may further help to secure the carrier 780 within the shell 750 to prevent any movement of the contact components 730 during use.

Alternatively, the engaging member 792 may have an outer surface that is orthogonal to the front surface 782. In addition, recess 794 may allow a corresponding protrusion 776 to be formed within the recess to help secure the carrier 780 in shell 750. As discussed above, the contact carrier 780 may have a plurality of openings 786. As shell 750 is formed around carrier 780, the material forming shell 750 may flow through each of the openings 786 to form a mechanical lock securing the carrier 780 to shell 750 making these components integrally joined. Each opening 786 may be a cylindrical hole or may be a truncated conical shape such that the inner wall has a taper, or may be a different geometric shape. In the illustrated example, the openings 786 are symmetrically arranged about a center plane of the carrier 780, although in other examples, the openings 786 may be asymmetrically arranged. Further, the openings 786 may all be the same size or may have different shapes. For instance, the openings 786 may be larger on an upper portion of the carrier 780 than a bottom portion of the carrier 780 or may be larger on a bottom portion than an upper portion, or may be larger on a left side than a right side, or may be larger on a right side than a left side. The alignment aperture 788 may help to align and secure the contact carrier 780 within a mold when the lower shell 750 is formed. The alignment aperture 788 may engage a corresponding feature within the mold to secure the contact carrier assembly 775 within the mold to ensure proper alignment of the contact components 730.

Figure 23:
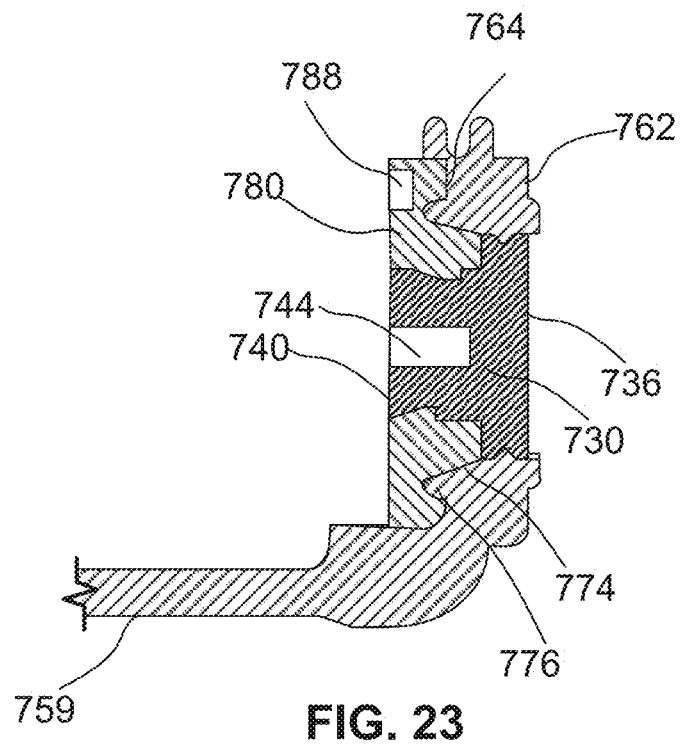
FIG. 23 illustrates a cross-sectional perspective view of a portion of the lower shell of the housing along line 23-23 of FIG. 21 according to aspects described herein.

Each contact component 730 may have a front portion 732 and a rear portion 734, where the front portion 732 includes the outward facing surface 736 and a forward perimeter region 738 surrounding the outward facing surface 736, and the rear portion includes the inward facing surface 740, a rear perimeter region 742 surrounding the inward facing surface 740, and an opening 744 on the inward facing surface 740. In addition, the forward perimeter region 738 of each contact component 730 may be secured to sidewall 762 of lower shell 750 to form a sealed edge to prevent ingress of liquids into the interior cavity 702 to protect the electronic components and prolong the life of the battery cells 60. In some examples, each contact component 730 may be encased by different materials. For instance, as shown in FIG. 23, the forward perimeter region 738 may be partially or fully encased within sidewall 762 of the lower shell 750, where sidewall 762 is formed from a first material and the rear perimeter region 742 may be partially or fully encased within contact carrier 780 that is formed from a second material. The first material may have a lower stiffness or lower hardness than the second material. For example, the first material (i.e. the material forming shells 710, 750) may be a rubber or elastomeric material. For example, the first material (i.e. for the shells 710, 750) may be thermoplastic vulcanizates (TPV), a thermoplastic elastomer (TPE) such as a thermoplastic elastomeric olefin (TEO), or other similar material. The second material (i.e. the material of the contact carrier 780) may be a more rigid polymeric material, such as a polycarbonate (PC) or polypropylene (PP). For example, the first material forming the shells 710, 750 may have a durometer of approximately 70 Shore A, or within a range of 55 and 90 Shore A, while the second material forming the contact carrier 780 may have a durometer of approximately 50 Shore D or greater, or within a range of 40 Shore D and 70 Shore D, or in some cases within a range of 30 Shore D and 80 Shore D. This combination provides an elastomeric material around the outboard portion 732 to help with sealing, while the more rigid carrier 780 provides a support to the rear portion 734 to keep the contacts 730 aligned and prevent any contact movement when the contacts 730 are connected to a charger.

As shown in FIGS. 26A-27D, the contact component 730 may have multiple features to help secure and seal the contact component 730 to both the lower shell 750 and contact carrier 780. Both the forward and rear portions 732, 734 may have a generally cylindrical in shape. Although, these portions 732, 734 may have any geometric shape while still providing adequate surface area to make an electrical connection. The forward portion 732 may have a larger diameter than the rear portion 734. In addition, the forward perimeter region 738 may have a groove 746 that extends around the entire forward perimeter region 738. The groove 746 may have a width, W1, which is approximately 50 percent of the length, L1, of the forward portion 732, or within a range of 25 percent and 75 percent of the length, L1. The groove 746 may also have a depth of approximately 50 percent of the width, W1, or within a range of 25 percent and 75 percent of the width, W1. While the contact component 730 illustrated in FIGS. 26A through 27D has only a single groove 746, other exemplary contact components 730 may have a plurality of concentric grooves 746. Still other exemplary contact components 730 may have a different texture or contours along the forward perimeter region 738 such as knurling, longitudinal or angled gear teeth, or other similar texturing. The rear portion 734 may have a textured region 748 around the rear perimeter region 742 that in some examples may be an arrangement of angled or helical gear teeth. The gear teeth extend along a majority of the rear perimeter portion 742 and may also extend into the inward facing surface 740. The gear teeth 748 may be arranged at an acute angle to the inward facing surface 740. In some examples, the acute angle may be greater than zero to provide a bearing surface at an angle to any type of direct pullout force. The angled teeth also help to secure against any rotation of the contact component 730 in the contact carrier 780. In some examples, as an alternative to gear teeth, the textured region 748 may include knurling, grooves, or some combination of the textures. The rear portion 734 may have a length, L2, which is over two times greater than the length, L1, the forward portion 732. Opening 744 may be configured to receive conductive element to connect the flexible circuit 62 to the contact component 730, which may be a mechanical fastener. In this example, the opening 744 may have female threads such that when the mechanical fastener is inserted into the opening 744, an electrical connection between the contact component 730 and battery cells 60 is made while also providing a mechanical connection between them. The diameter of the outer facing surface 736 may be within a range of 0.29 inches and 0.31 inches, or in some examples, may be within a range of 0.25 inches and 0.35 inches.

Figure 28:
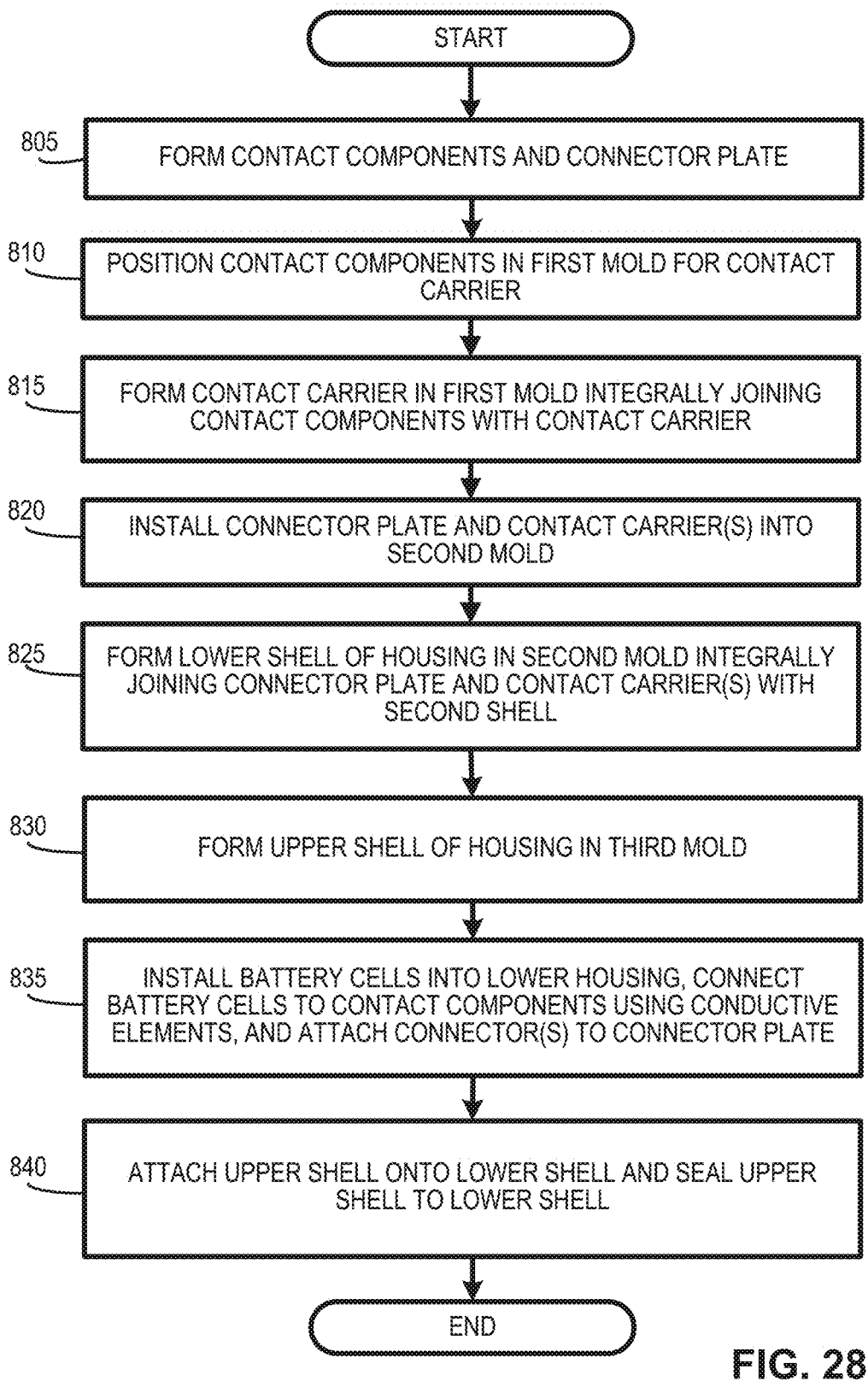
FIG. 28 illustrates a flowchart of exemplary steps to form the housing and assemble the battery cells into the housing to form the CWB.

FIG. 28 illustrates an exemplary method for forming the housing 700 for CWB 50 and assembling the battery cells 60 into the housing. In operation 805, the contact components 730 may be formed using a machining, forging, stamping, or other processes known to one skilled in the art. The contact components 730 may be formed from a conductive material, such as a brass, gold, copper, silver, aluminum, steel, or other electrically conductive material or combination of one or more electrically conductive materials. The connector plate 720 may be formed from a metallic or non-metallic material and may be formed using a machining, forging, molding, stamping, or other process known to one skilled in the art.

In operations 810 and 815, the contact components 730 may be inserted into a first mold configured to form the contact carrier 780. The contact carrier 780 may be formed using a molding process such as injection molding from a non-metallic material. The contact carrier 780 may be formed from a polymeric material as described above that may a stiffness that is greater than the stiffness of the material that forms the shells 710, 750. For example, the material forming the contact carrier 780 may have a modulus (i.e. stiffness) that is 1.5 times greater than a modulus (i.e. stiffness) of the material forming the lower shell 750 (or upper shell 710). Because the contact carrier 780 may be formed from a rigid impact absorbing material, the contact carrier 780 may be easier to hold within the mold. With the contact components 730 installed within the mold, the contact carrier 780 is formed within the mold. As the contact carrier 780 is formed, the material forming the contact carrier 780 flows around the rear portion 734 of each contact component 730 including between the helical gear teeth 748 to form a mechanical lock around the rear portion 734 of each contact component 730 to secure them to the contact carrier 780.

In operations 820 and 825, after removing contact carrier 780 from the first mold, the contact carrier 780 and a connector plate 720 may be installed into a second mold. The lower shell 750 is then formed using injection molding or similar type process from a non-metallic material different from the material of the contact carrier 780. As the lower shell 750 is formed, the material forming the lower shell 750 flows around the contact carrier 780 forming the rear flange 766 and also the plugs 768 may be formed by flowing through the openings 786 to secure the contact carrier(s) 780 to the lower shell 750. Similarly, as the lower shell 750 is formed, the material forming the lower housing 750 may flow around the connector plate 720 to secure the connector plate 720 to the lower housing 750.

Figure 18A:
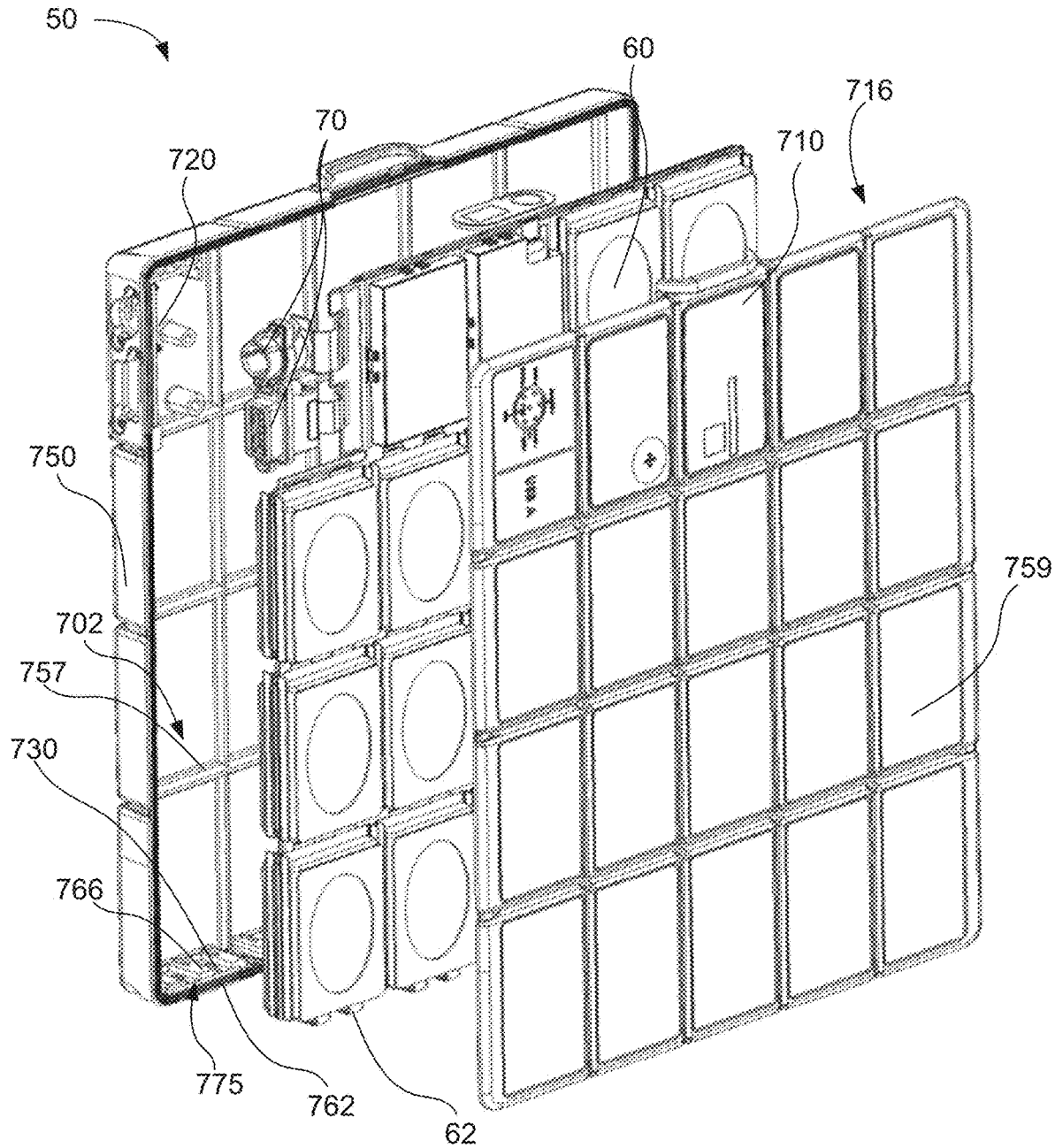
FIG. 18A illustrates an exploded perspective view of the exemplary conformal wearable battery of FIG. 16 according to aspects described herein.
Figure 18B:
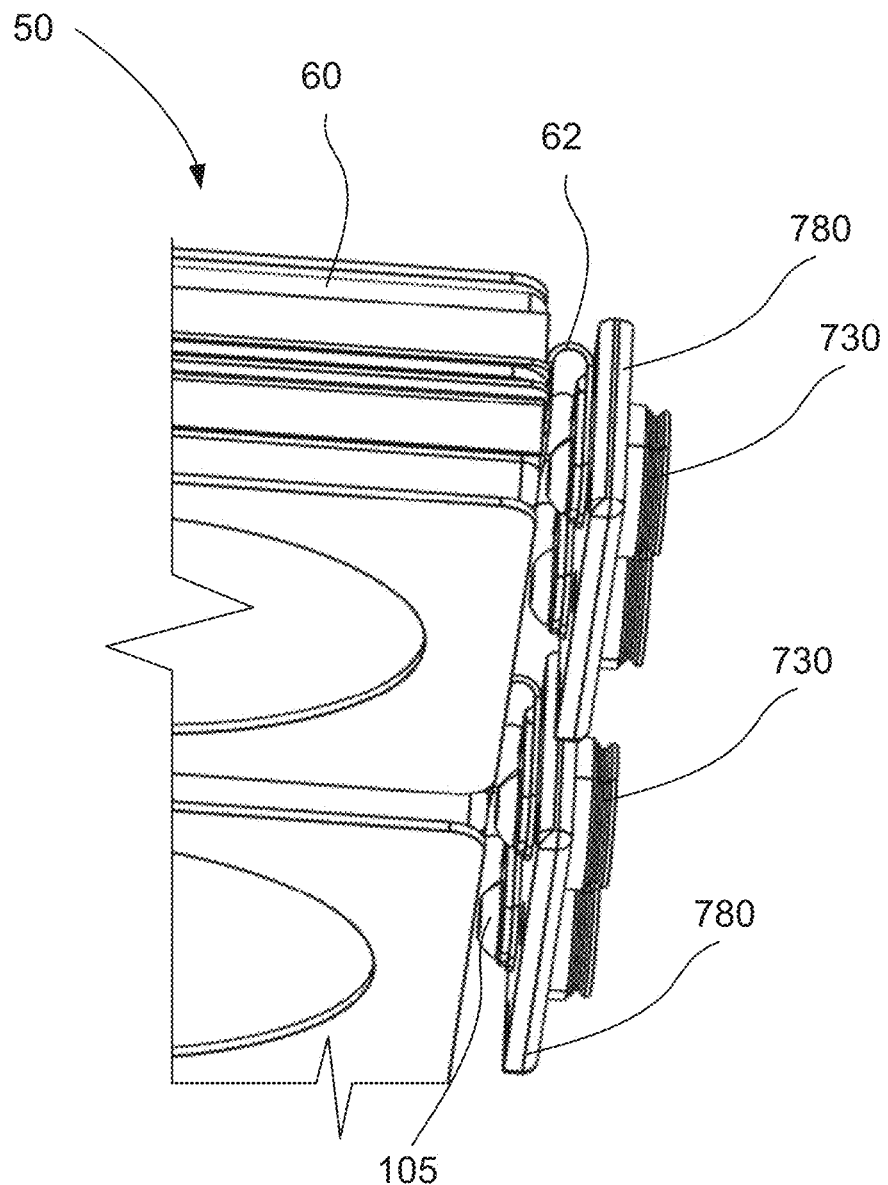
FIG. 18B illustrates a partial perspective view of the exemplary CWB of FIG. 16 with some components removed for clarity according to aspects described herein.
Figure 19:
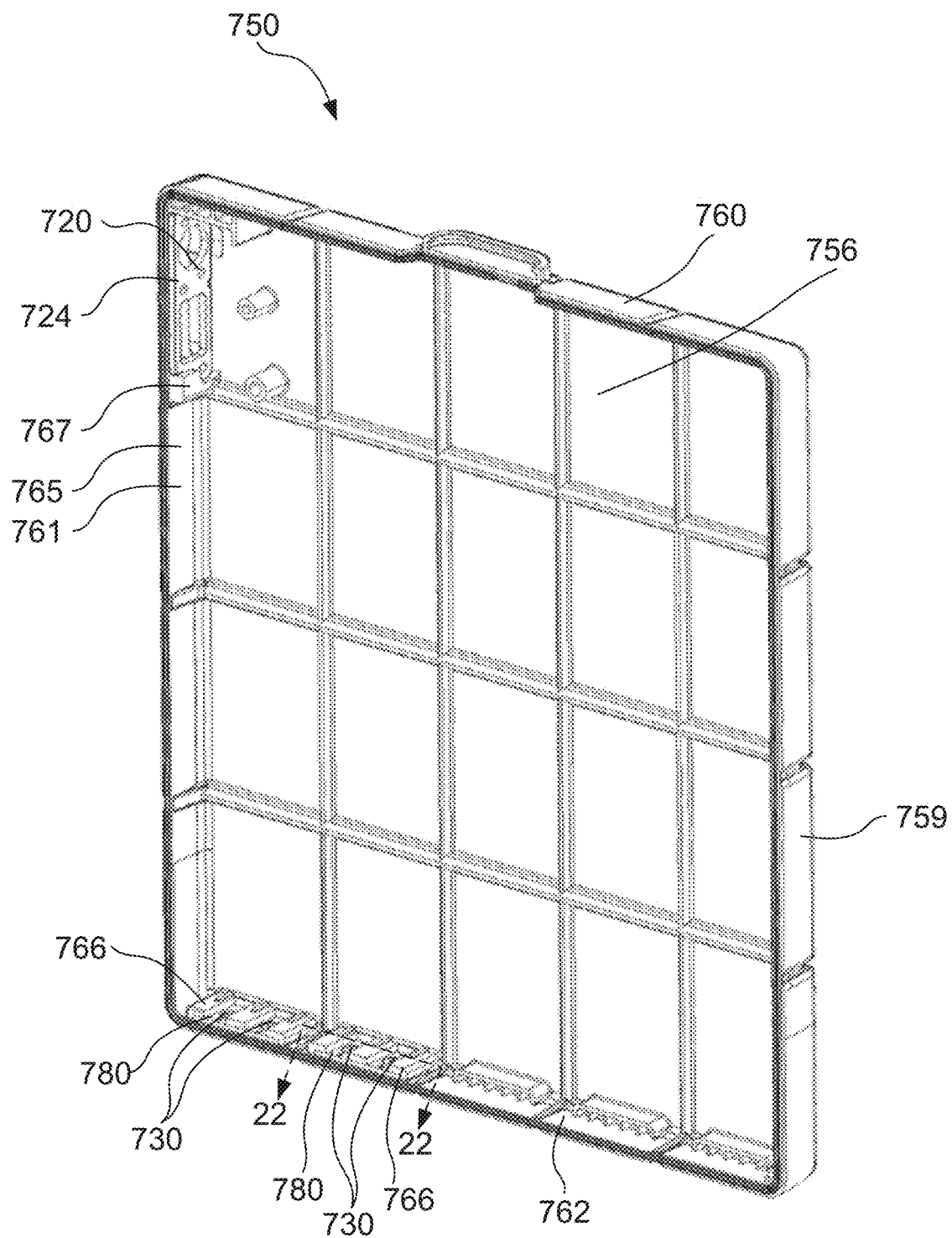
FIG. 19 illustrates a perspective view of a lower shell of a housing for the exemplary conformal wearable battery of FIG. 16 according to aspects described herein.
Figure 20:
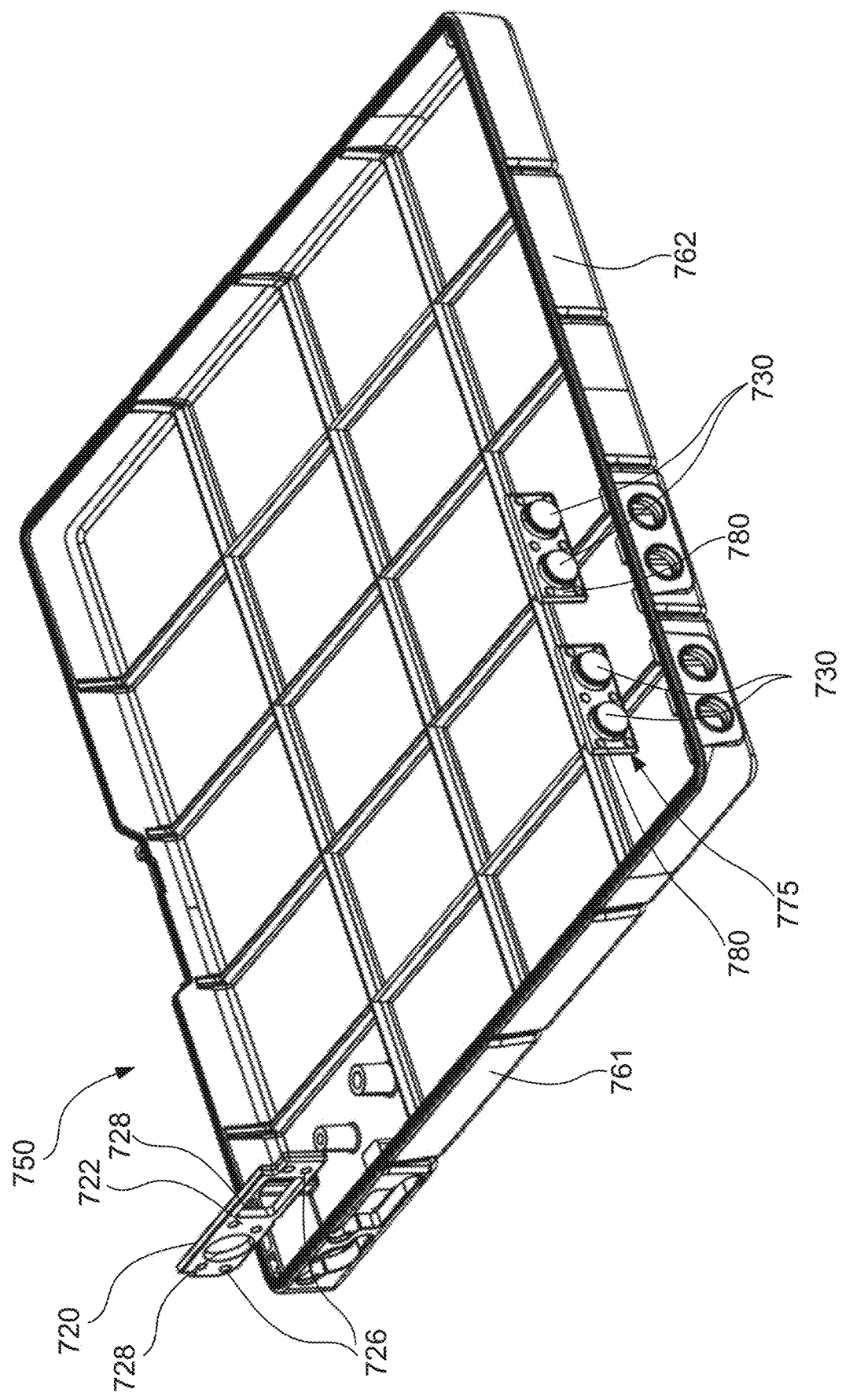
FIG. 20 illustrates an exploded perspective view of the lower shell of FIG. 19 according to aspects described herein.

In operations 830 and 835, the upper shell 710 may be formed using injection molding or similar type process from the same or similar material similar forming the lower shell 750 in a third mold. Next, the battery cells 60 may be installed into the lower housing 750. A connector 70 from the battery cells 60 may be inserted into an opening of the connector plate 720 and then secured to the connector plate 720. In addition, the battery cells 60 may be electrically connected through a conductive element 105 (i.e. a mechanical fastener) inserted into opening 744 of each contact component 730. As shown in FIG. 18B, the battery cells 60 may include a plurality of flex circuits 62 that have conductive features such that each flex circuit 62 may receive a conductive element to provide an electrical connection between the battery cells 60 and each contact component 730.

Lastly, in operation 840, the upper shell 710 may be attached to the lower shell 750 along with the two shells 710, 750 being sealed together to help the CWB 50 meet the environmental requirements. In some examples, the upper shell 710 and/or the lower shell 750 may have a second polymeric material molded along the perimeter of either or both shells 710, 750 that has a dye, such as a deep red aniline dye, that causes the material to be an infrared transmitter This second material may allow the upper shell 710 and the lower shell 750 to be laser welded to permanently join the shells together to seal the CWB 50.

Aspects of the disclosure have been described in terms of illustrative examples thereof.

Numerous other examples, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A conformal wearable battery comprising:
   a plurality of battery cells arranged in a grid-like pattern, wherein the plurality of battery cells includes a positive terminal and a negative terminal to provide electricity through a transfer of electrons between the positive terminal and negative terminal; and
   a housing that includes:
      a first shell formed from a first member having a first plurality of rigid regions and a second member that has a first flexible region located between a first rigid region and a second rigid region of the first plurality of rigid regions, and wherein the first shell includes a front wall with an outward facing surface formed from outward facing surfaces of the first plurality of rigid regions and an outward facing surface of the second member,
      wherein each rigid region of the first plurality of rigid regions is spaced apart from an adjacent rigid region, and is connected to the adjacent rigid region, by a channel on the first member, wherein the channel is visible along an inward facing surface of the front wall of the first shell; and
      a second shell attached to the first shell, wherein the second shell includes a third member having a second plurality of rigid regions and a fourth member that has a second flexible region located between a first rigid region and a second rigid region of the second plurality of rigid regions, and wherein the second shell has an outward facing surface formed from outward facing surfaces of the second plurality of rigid regions and an outward facing surface of the second member;
      wherein the first member is formed as a unitary member and the second member is joined to the first member,
      wherein the first member is formed from a first material and the second member is formed from a second material, wherein the first material has a hardness that is greater than a hardness of the second material; and
   wherein the first shell connects to the second shell to form an interior cavity that receives the plurality of battery cells.

2. The conformal wearable battery of claim 1, wherein the third member is formed from the first material and the fourth member is formed from the second material.

3. The conformal wearable battery of claim 2, wherein the first material comprises a polycarbonate, and the second material comprises a thermoplastic elastomer.

4. The conformal wearable battery of claim 1, wherein the first rigid region of the first plurality of rigid regions includes a first outward facing surface, a first inward facing surface, and a first edge region along a majority of a perimeter of the first rigid region extending between the first outward facing surface and the first inward facing surface.

5. The housing of claim 4, wherein the first edge region includes a first edge surface and a second edge surface, wherein the first edge surface and the second edge surface extend in different directions.

6. The housing of claim 5, wherein the second member has a second edge region that has a complementary structure to the first edge region such that the first member and the second member are substantially coplanar on adjacent surfaces of the first edge region.

7. A housing for a plurality of battery cells arranged in a grid-like pattern, the housing comprising:
   a first shell having a first member having a plurality of rigid regions and a second member that has a flexible region located between a first rigid region and a second rigid region of the plurality of rigid regions, and wherein a first wall of the first shell has an outward facing surface formed from outward facing surfaces of the plurality of rigid regions and an outward facing surface of the second member,
   a second shell attached to the first shell forming an interior cavity between the first shell and the second shell,
   wherein the first member is formed as a unitary member and the second member is joined to the first member, and
   wherein the first member is formed from a first material and the second member is formed from a second material, wherein the first material having a first hardness and the second material has a second hardness, wherein the first hardness is greater than the second hardness; and
   wherein each rigid region of the plurality of rigid regions is spaced apart from an adjacent rigid region, and is connected to the adjacent rigid region, by a channel on the first member, wherein the channel is visible along an inward facing surface of the first wall of the first shell.

8. The housing of claim 7, wherein the plurality of rigid regions are arranged in an array with the plurality of rigid regions in both a horizontal direction and a vertical direction that correspond to the grid-like pattern of the plurality of battery cells.

9. The housing of claim 7, wherein the channel acts as a living hinge.

10. The housing of claim 7, wherein the channel has a thickness that is less than a thickness of the first rigid region.

11. The housing of claim 7, wherein the first rigid region of the plurality of rigid regions includes a first outward facing surface, a first inward facing surface, and a first edge region along a majority of a perimeter of the first rigid region extending between the first outward facing surface and the first inward facing surface.

12. The housing of claim 11, wherein the first edge region includes a first edge surface that extends substantially perpendicular to the first outward facing surface and a second edge surface has a portion that extends substantially perpendicular to the first edge surface.

13. The housing of claim 12, wherein the second edge surface includes a curved portion.

14. The housing of claim 7, wherein a thickness of the first rigid region is substantially the same as a thickness of the flexible region, wherein the thickness of the first rigid region is measured at a center of the first rigid region and the thickness of the flexible region is measured at a location adjacent a first edge region of the first rigid region.

15. The housing of claim 7, wherein the second shell includes a third member having a second plurality of rigid regions and a fourth member that has a second flexible region located between a first rigid region and a second rigid region of the second plurality of rigid regions, and wherein a first wall of the second shell has an outward facing surface formed from outward facing surfaces of the plurality of rigid regions and an outward facing surface of the second member.

16. The housing of claim 7, wherein the second member includes a plurality of horizontal grooves and a plurality of vertical grooves.

17. A housing for a plurality of battery cells arranged in a grid-like pattern, the housing comprising:
   a first shell having a first member having a plurality of rigid regions and a second member that has a flexible region located between a first rigid region and a second rigid region of the plurality of rigid regions, and wherein a first wall of the first shell has an outward facing surface formed from outward facing surfaces of the plurality of rigid regions and an outward facing surface of the second member, wherein the plurality of rigid regions are arranged in an array with the plurality of rigid regions in both a horizontal direction and a vertical direction that correspond to the grid-like pattern of the plurality of battery cells and each rigid region of the plurality of rigid regions are spaced apart from an adjacent rigid region and is connected to the adjacent rigid region by a channel,
   wherein the first member is formed as a unitary member and the second member is joined to the first member,
   wherein the first member is formed from a first material and the second member is formed from a second material, wherein the first material having a first hardness and the second material has a second hardness, wherein the first hardness is greater than the second hardness; and
   wherein each rigid region of the plurality of rigid regions is spaced apart from an adjacent rigid region, and is connected to the adjacent rigid region, by a channel on the first member, wherein the channel is visible along an inward facing surface of the first wall of the first shell.

18. The conformal wearable battery of claim 1, wherein the first member and the second member are joined at an interface between the first rigid region of the first member and the first flexible region of the second member, wherein the first rigid region and the first flexible region have complementary edge regions that include substantially perpendicular surfaces on the first rigid region.

* * * * *

UNITED STATES PATENT AND TRADEMARK OFFICE
CERTIFICATE OF CORRECTION

PATENT NO. : 11,081,755 B1
APPLICATION NO. : 17/085873
DATED : August 3, 2021
INVENTOR(S) : Elijah Brett Goldin et al.

It is certified that error appears in the above-identified patent and that said Letters Patent is hereby corrected as shown below:

In the Specification

Column 11, Detailed Description, Line 49:
After "130.", delete "¶"

Column 23, Detailed Description, Line 8:
After "use.", delete "¶"

Column 26, Detailed Description, Line 4:
After "thereof.", delete "¶"

In the Claims

Column 27, Claim 5, Line 1:
Delete "housing" and insert -- conformal wearable battery -- therefor Column 27, Claim 6, Line 5:
Delete "housing" and insert -- conformal wearable battery -- therefor Signed and Sealed this
Seventh Day of June, 2022

Katherine Kelly Vidal
*Director of the United States Patent and Trademark Office*